US008922143B2

(12) United States Patent
Takahashi

(10) Patent No.: US 8,922,143 B2
(45) Date of Patent: Dec. 30, 2014

(54) CONTROL SYSTEM FOR A ROTARY MACHIINE

(75) Inventor: Tomoya Takahashi, Anjo (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 13/606,518

(22) Filed: Sep. 7, 2012

(65) Prior Publication Data

US 2013/0063056 A1 Mar. 14, 2013

(30) Foreign Application Priority Data

Sep. 13, 2011 (JP) ................................ 2011-199792

(51) Int. Cl.

| | |
|---|---|
| ***H02P 6/06*** | (2006.01) |
| ***H02P 27/12*** | (2006.01) |
| ***H02P 21/00*** | (2006.01) |
| ***H02P 21/14*** | (2006.01) |

(52) U.S. Cl.

CPC ............ *H02P 27/12* (2013.01); *H02P 21/0003* (2013.01); *H02P 21/0035* (2013.01); *H02P 21/14* (2013.01)

USPC ................................ 318/400.02; 318/400.03

(58) Field of Classification Search

USPC .......... 318/400.02, 400.03, 400.07, 148, 801, 318/811, 139

See application file for complete search history.

(56) References Cited

U.S. PATENT DOCUMENTS

| | | | | |
|---|---|---|---|---|
| 6,747,884 | B2 * | 6/2004 | Nishizawa et al. | 363/132 |
| 6,979,975 | B1 * | 12/2005 | Kinpara et al. | 318/400.02 |
| 2009/0160376 | A1 * | 6/2009 | Yamada | 318/400.02 |
| 2009/0160381 | A1 * | 6/2009 | Imura et al. | 318/400.15 |
| 2009/0322264 | A1 * | 12/2009 | Imura | 318/400.09 |
| 2011/0006711 | A1 * | 1/2011 | Imura et al. | 318/400.07 |
| 2011/0031910 | A1 * | 2/2011 | Takahashi | 318/400.3 |
| 2011/0050137 | A1 * | 3/2011 | Imura et al. | 318/400.15 |
| 2011/0169436 | A1 * | 7/2011 | Takahashi et al. | 318/400.3 |

FOREIGN PATENT DOCUMENTS

JP 2008-228419 9/2008

OTHER PUBLICATIONS

T. Maeda et al., "Performance Improvement of Torque Control System of PSMSM based on Model Predictive Control at High Speed", 2011 IEE Japan, Mar. 16-18, 2011, pp. 195-196, with spot translation.

* cited by examiner

*Primary Examiner* — Rina Duda
*Assistant Examiner* — Bickey Dhakal
(74) *Attorney, Agent, or Firm* — Nixon & Vanderhye PC

(57) ABSTRACT

An estimation section estimates a time period required for a norm of a difference vector between a current flowing to a motor/generator and a command current to attain a threshold level r in each switching mode provisionally set by a mode setting section. A mode determination section determines the switching mode of the longest required time period to be a final switching mode. A drive section controls an inverter to operate in the switching mode determined by the mode switching section.

10 Claims, 22 Drawing Sheets

FIG. 1

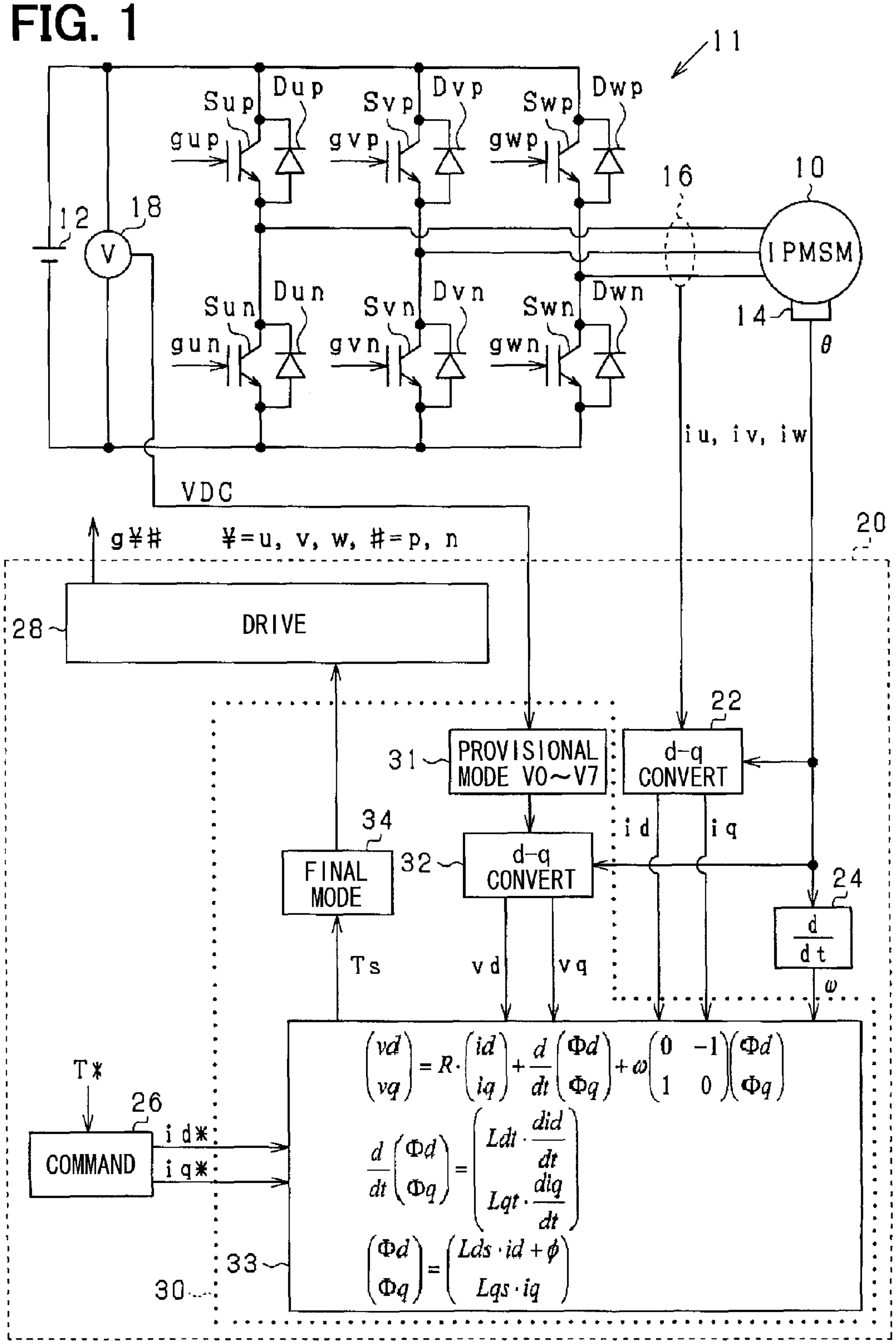

$$\begin{pmatrix} vd \\ vq \end{pmatrix} = R\cdot\begin{pmatrix} id \\ iq \end{pmatrix} + \frac{d}{dt}\begin{pmatrix} \Phi d \\ \Phi q \end{pmatrix} + \omega\begin{pmatrix} 0 & -1 \\ 1 & 0 \end{pmatrix}\begin{pmatrix} \Phi d \\ \Phi q \end{pmatrix}$$

$$\frac{d}{dt}\begin{pmatrix} \Phi d \\ \Phi q \end{pmatrix} = \begin{pmatrix} Ldt\cdot\frac{did}{dt} \\ Lqt\cdot\frac{diq}{dt} \end{pmatrix}$$

$$\begin{pmatrix} \Phi d \\ \Phi q \end{pmatrix} = \begin{pmatrix} Lds\cdot id + \phi \\ Lqs\cdot iq \end{pmatrix}$$

| SWITCHING MODE | TURNED-ON SW | | |
|---|---|---|---|
| 0 | Sun | Svn | Swn |
| 1 | Sup | Svn | Swn |
| 2 | Sup | Svp | Swn |
| 3 | Sun | Svp | Swn |
| 4 | Sun | Svp | Swp |
| 5 | Sun | Svn | Swp |
| 6 | Sup | Svn | Swp |
| 7 | Sup | Svp | Swp |

CONTROL SYSTEM FOR A ROTARY MACHIINE

CROSS REFERENCE TO RELATED APPLICATION

This application is based on and incorporates herein by reference Japanese patent application No. 2011-199792 filed on Sep. 13, 2011.

TECHNICAL FIELD

The present disclosure relates to a control system for a rotary machine, which controls a control amount including at least one of current, torque and magnetic flux of the rotary machine by turning on and off switching devices of a power conversion circuit. The switching devices of the power conversion circuit turn on and off electric connection between voltage supply sections, which supply respective voltages different one another, and terminals of the rotary machine.

BACKGROUND

JP 2008-228419A proposes one exemplary control system, which performs model estimation (prediction) control. The control system estimates a current flowing to a three-phase motor in correspondence to each switching mode determined by on/off of switching devices of an inverter (power conversion circuit), and operates the inverter in a switching mode, which minimizes an error between the estimated current and a command current. Since the inverter is operated to optimize changes of the current estimated based on an output voltage of the inverter, the follow-up characteristic of an actual current relative to the command current at the time of transient condition is improved relative to a case of PWM control performed by triangular wave comparison.

The model estimation control is therefore highly effective for a control system for a motor/generator as a main in-vehicle apparatus, which requires high performance in the transient-time follow-up characteristic.

In case the model estimation control is used, it is possible to change the switching mode to an optimum mode each time the switching mode is allowed to be updated. As a result, it is likely that the switching mode will be changed too frequently.

SUMMARY

It is therefore an object to provide a novel and improved control system for a rotary machine, which controls a control amount including at least one of current, torque and magnetic flux of the rotary machine by turning on and off switching devices of a power conversion circuit. The switching devices of the power conversion circuit turn on and off electric connection between voltage supply sections, which supply respective voltages different one another, and terminals of the rotary machine.

According to one aspect, a control system for a rotary machine is provided with a power conversion circuit and a control apparatus, which includes an estimation section and an update timing setting section. The power conversion circuit includes switching devices and controls a control amount including at least one of current, torque and magnetic flux of the rotary machine by turning on and off the switching devices. The switching devices of the power conversion circuit turn on and off electric connection of voltage supply sections, which supply respective voltages different one another, and terminals of the rotary machine. The estimation section estimates a time period required for a degree of deviation between the control amount and a command value reaches a predetermined value with respect to a specified switching mode among switching modes indicating an on/off condition of each of the switching devices of the power conversion circuit. The update timing setting section sets an update timing of the switching mode based on the estimated required time period.

BRIEF DESCRIPTION OF THE DRAWINGS

The above and other objects, features and advantages will become more apparent from the following detailed description made with reference to the accompanying drawings. In the drawings:

FIG. 1 is a system diagram according to a first embodiment of a control system;

EMBODIMENT

First Embodiment

Figures 2A, 2B:
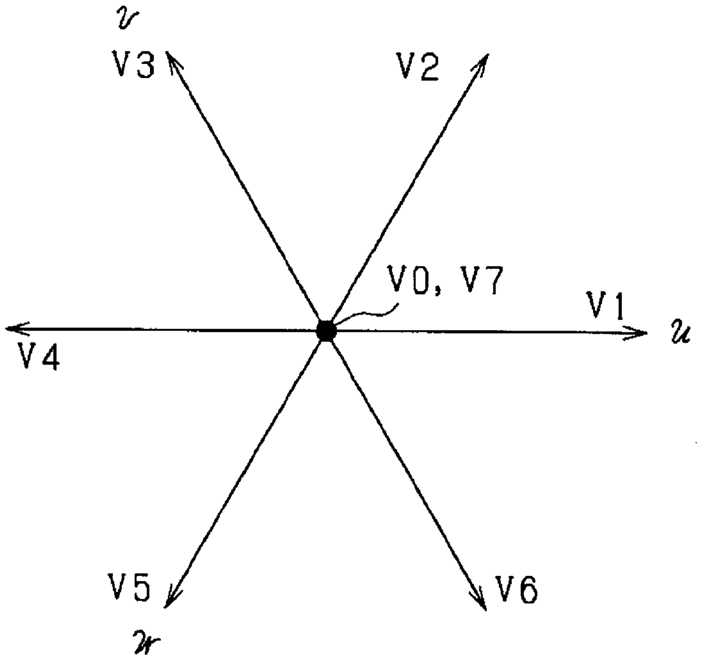
FIGS. 2A and 2B are diagrams showing switching modes according to the first embodiment.

A first embodiment of a control system for a rotary machine will be described below with reference to FIG. 1, in which the control system is applied to a motor/generator 10 provided as an in-vehicle main rotary machine.

The motor/generator 10 is a three-phase permanent magnet synchronous motor. The motor/generator 10 is a rotary machine (salient machine) having salient poles. Specifically, the generator is an interior permanent magnet synchronous motor (IPMSM).

The motor/generator 10 is connected to a high voltage battery 12 through an inverter 11. The inverter 11 is a power conversion circuit, which has three sets of series-connected arms of high potential-side (positive-side) and low potential-side (negative-side) switching devices S¥ p and S¥ n (¥ =u, v, w). Junctions in these series-connected arms are connected to three-phase (U-phase, V-phase and W-phase) terminals of the motor/generator 10, respectively. An insulated-gate bipolar transistor (IGBT) is used as each switching device S¥ # (¥ =u, v, w; #=p, n). A diode D¥ # is connected in parallel to each switching device.

The following detection sections are provided for detecting states of the motor/generator 10 and the inverter 11. A rotation angle sensor 14 is provided for detecting a rotation angle (electric angle θ) of the motor/generator 10. A current sensor 16 is provided for detecting currents iu, iv and iw flowing in respective phases of the motor/generator 10. A voltage sensor 18 is provided for detecting an input voltage (power supply voltage) of the inverter 11.

Detection values of these sensors are inputted to a control apparatus 20, which forms a low voltage system, through an interface (not shown). The control apparatus 20 generates and outputs drive signals (gate signals), which drive the inverter 11, based on the detection values of these sensors. The signal for driving or operating the switching device S¥ # of the inverter 11 is identified as g¥ #.

The control apparatus 20 drives the inverter 11 to control a torque of the motor/generator 10 to a demand torque T*. Specifically, it drives the inverter 11 so that the current flowing to the motor/generator 10 equal a command current, which is determined to attain the demand torque. Although the torque of the motor/generator 10 is a final control amount, the current flowing in the motor/generator 10 is controlled to the command current assuming that the current flowing in the motor/generator 10 is a final control amount, which is controlled directly to control the torque.

The control apparatus 20 is configured or programmed to perform model estimation (prediction) control, which determines actual switching modes of the inverter 11, for controlling the current flowing in the motor/generator 10 to the command current. Specifically, the current of the motor/generator 10 is estimated by provisionally setting the switching mode of the inverter 11 to each of plural switching modes.

The switching modes indicate whether each switching devices S¥ # of the inverter 11 is turned on or off. As shown in FIG. 2A, eight switching modes 0 to 7 are provided. For example, all the switching devices Sun, Svn and Swn at the low potential (negative) side are turned on in the switching mode 0. All the switching devices Sup, Svp and Swp at the high potential (positive) side are turned on in the switching mode 7. In the switching modes 0 and 7, all the phases of the motor/generator 10 are short-circuited and the voltage supplied from the inverter 11 to the motor/generator 10 is zero. As a result, the output voltage vector of the inverter 11 is set to a zero voltage vector.

The remaining six switching modes 1 to 6 set six different drive patterns, in which at least one of the switching devices in each of the high potential side and the low potential side is turned on. As a result, the output voltage vector of the inverter 11 is an effective voltage vector.

Voltage vectors V0 to V7 are shown in correspondence to the switching modes 0 to 7, respectively, in FIG. 2B. The voltage vectors V0 to V7 indicate the output vectors of the inverter 11 outputted in the switching modes 0 to 7, respectively. The voltage vectors V1, V3 and V5 corresponding to the switching modes 1, 3 and 5 correspond to the positive sides of the U-phase, the V-phase and the W-phase, respectively, as shown in FIGS. 2A and 2B.

The model estimation control will be described in detail below.

The actual currents iu, iv and iw detected by the current sensor 16 shown in FIG. 1 are converted by a d-q conversion section 22 into actual currents id and iq in the rotating coordinate system. The rotation angle (electric angle θ) detected by the rotation angle sensor 14 is inputted to a velocity calculation section 24 to calculate a rotation velocity (electric angular velocity ω). A command current setting section 26 inputs the demand torque T* and outputs command currents id* and iq* in the d-q coordinate system. The command currents id* and iq*, the actual currents id and iq, the electric angular velocity ω and the electric angle θ are inputted to the model estimation section 30. The model estimation section 30 determines the switching mode of the inverter 11 based on these input parameters and output it to a drive section 28. The drive section 28 generates the drive signal g¥ # based on the inputted switching mode and outputs it to the inverter 11.

Processing of the model estimation section 30 will be described in detail next. In a mode setting section 31, the switching mode of the inverter 11 shown in FIG. 2A is set provisionally. This processing provisionally sets the voltage vector, which correspond to the switching mode, in actuality. In the section 32, the voltage vector Vdq=(vd, vq) in the d-q coordinate system is calculated by converting the voltage vector provisionally set in the mode setting section 31. For performing such conversions, the voltage vectors V0 to V7 provisionally set in the mode setting section 31 may be expressed as VDC/2 and −VDC/2 in case that the high side arm is turned on and the low side arm is turned on, respectively. In this instance, the voltage vector V0 is expressed as (−VDC/2, −VDC/2, −VDC/2) and the voltage vector V1 is expressed as (VDC/2, −VDC/2 and −VDC/2).

In an estimation section (prediction section) 33, a time period Ts required for a norm of a difference vector between the current flowing in the motor/generator 10 and the command currents id* and iq* to attain the threshold level r is estimated in each switching mode provisionally set by the mode setting section 31 based on the voltage vector (vd, vq), the actual currents id, iq and the electric angular velocity ω. This estimation is made for each of the plural switching modes provisionally set by the mode setting section 31.

In a mode determination section 34, a final switching mode of the inverter 11 is determined based on the inputted required time period Ts. The drive section 28 generates the drive signal g¥ # based on the determined switching mode and outputs it.

In the model estimation section 33, estimation processing is performed based on a model equation expressed by the following equations (c1) and (c2).

$$vd=R\cdot id+Ldt\cdot(did/dt)-\omega\cdot Lqs\cdot iq \quad (c1)$$

$$vq=R\cdot iq+Lqt\cdot(diq/dt)+\omega\cdot Lds\cdot id+\omega\cdot\phi \quad (c2)$$

Here, R is a resistance, $\phi$ is an armature flux linkage constant, Lds is a d-axis steady-state inductance, Ldt is d-axis transient-state inductance, Lqs is a q-axis steady-state inductance and Lqt is a q-axis transient-state inductance. The equations (c1) and (c2) are deduced as described in the last part of the description.

Figure 3:
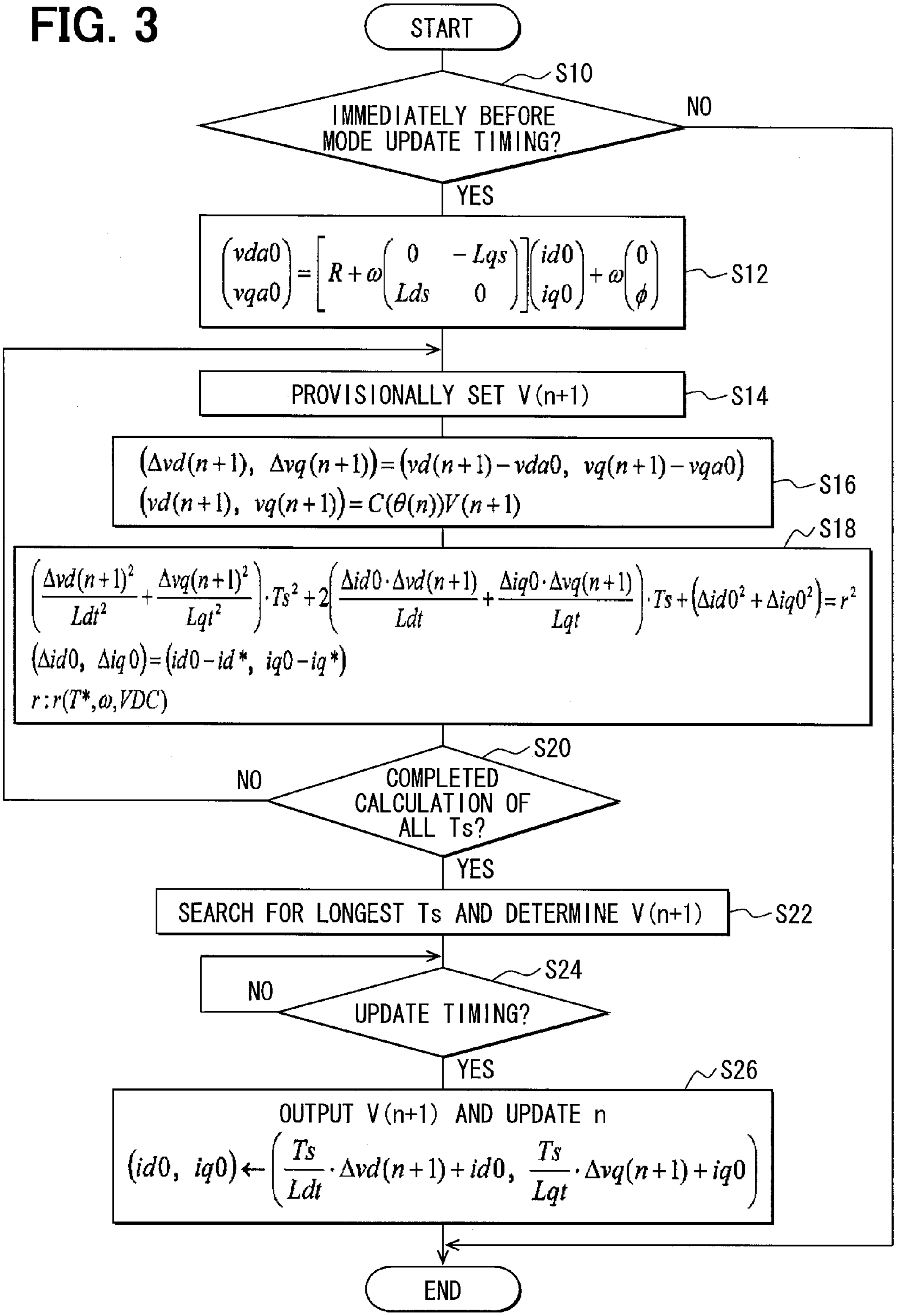
FIG. 3 is a flowchart showing model estimation control processing according to the first embodiment.

The model estimation processing is shown in FIG. 3. This processing is repeated, for example, at every predetermined interval.

In a series of processing steps, it is first checked at step S10 whether it is immediately before an update timing of the switching mode set as described below. When it is determined at step S10 that it is immediately before the update timing, an average voltage vector (vda0, vqa0), which is an average output voltage vector of the inverter 11, is calculated at step S12. This is calculated by the following equations (c3) and (c4), which are derived by eliminating the terms of transient-state inductances Ldt and Lqt from the above-described equations (c1) and (c2) and substituting estimated values of actual currents id0 and iq0 of the update timing. The estimation method will be described below.

$$vda0=R\cdot id0-\omega\cdot Lqs\cdot iq0 \quad (c3)$$

$$vqa0=R\cdot iq0+\omega\cdot Lds\cdot id0+\omega\cdot\phi \quad (c4)$$

At the following steps S14 to S20, the time period Ts required for the norm of the difference vector between the currents flowing in the motor/generator 10 and the command currents id* and iq* to attain the threshold level r is estimated in each case of plural switching modes (voltage vector V(n+1)) provisionally set at the update timing. That is, a time period, in which the actual currents id and iq remain within a permitted range, are estimated. The permitted range defines a range of deviation of the currents of the motor/generator 10 from the command currents id* and iq*. Specifically, at step S14, the switching mode (voltage vector V(n+1)) is set provisionally. Then at step S16, an instantaneous voltage vector (vd(n+1), vq(n+1)) of the inverter 11 corresponding to the voltage vector V(n+1) set provisionally is calculated. This is calculated as a difference between the voltage vector V(n+1) and the average voltage vector (vda0, vqa0). Here, d-axis and q-axis components of the voltage vector V(n+1) may be calculated based on the latest electric angle θ(n).

At the following step S18, the required time period Ts is calculated. This may be performed as follows.

A change in the current caused by the voltage vector V(n+1) is calculated by using the following equations (c5) and (c6). These equations (c5) and (c6) are derived by decomposing the voltage vector (vd, vq) of the equations (c1) and (c2) into the average voltage vector (vda0, vqa0) and the instantaneous voltage vector (Δvd(n+1), Δvq(n+1)) and by setting the instantaneous voltage vector (Δvd(n+1), Δvq(n+1)) to be equal to the term of the transient-state inductance in the equations (c1) and (c2).

$$\Delta vd=Ldt\cdot(did/dt) \quad (c5)$$

$$\Delta vq=lqt\cdot(diq/dt) \quad (c6)$$

Specifically, the change in the current is calculated by the following equations (c7) and (c8), which are derived by discretizing the equations (c5) and (c6) by the required time period Ts.

$$ide(n+1)=Ts\cdot(\Delta vd(n+1))/Ldt+id0 \quad (c7)$$

$$iqe(n+1)=Ts\cdot(\Delta vq(n+1))/Lqt+iq0 \quad (c8)$$

As a result, the following equation (c9) is derived.

$$\{ide(n+1)-id^*\}^2+\{iqe(n+1)-iq^*\}^2=r^2\{\Delta vd(n+1)^2/Ldt^2+\Delta vq(n+1)^2/Lqt^2\}\cdot Ts^3+2\{\Delta ido\cdot\Delta vd(n+1)/Ldt+\Delta iqo\cdot\Delta vq(n+1)/Lqt\}\cdot Ts+(\Delta ido^2+\Delta iq0^2)-r^2=0 \quad (c9)$$

$$(\Delta ido\Delta iq0)=(id0-id^*iq0-iq^*)$$

The required time period Ts is calculated by solving the quadratic equation (c9).

The threshold value r is set variably in accordance with the demand torque T*, the electric angular velocity ω and the power supply voltage VDC. The threshold value r is variably set in accordance with the demand torque T* to suppress a variation in an error ratio of the current flowing in the motor/generator 10. The current flowing in the motor/generator 10 increases as the demand torque T* increases. Therefore, if the threshold value is the same, the error ratio, which is a ratio of error of the current flowing in the motor/generator 10 relative to the command current occupies in the command current, decreases. For this reason, the variation in the error ratio is suppressed by increasing the threshold value r in correspondence to an increase in the demand torque T*.

The threshold value r is set variably in accordance with the electric angular velocity ω to optimize the number of times of switching and controllability (control performance) of the switching mode. If the threshold value r is fixed, the required time period Ts tends to decrease as the electric angular velocity ω decreases and hence the switching mode is switched more frequently. For this reason, the threshold value r is variably set in accordance with the electric angular velocity ω to prevent the frequency of switching the switching mode from increasing excessively, while suppressing degradation of control performance.

The threshold value r is set variably in accordance with the power supply voltage VDC to optimize the number of times of switching and control performance of the switching mode. If the threshold value r is fixed, the required time period Ts tends to decrease as the power supply voltage VDC increases and hence the switching mode is switched more frequently. For this reason, the threshold value r is variably set in accordance with the power supply voltage VDC to prevent the frequency of switching the switching mode from increasing excessively, while suppressing degradation of control performance.

After execution of step S18, it is checked at step S20 whether the required time period Ts has been calculated for all switching modes 0 to 7. If the check result at step S20 is negative, step S14 is repeated. If the check result at step S20 is affirmative, however, the switching mode (voltage vector V(n+1)) is determined at step S22. As a result, one of the switching modes corresponding to the longest one of the required time periods Ts calculated at step S18 is selected.

At the following step S24, it is checked whether it is the update timing of the switching mode. The update timing is determined basically based on the required time period Ts calculated at step S18 when the present switching mode is selectively determined by the processing of step S22. Although the update timing may differ from the required time period Ts in some cases, this case will be described in the description referring to FIG. 4. If the check result indicates that it is the update timing, the switching mode is updated at step S26 to set the output voltage vector of the inverter 11 to the voltage vector V(n+1). The voltage vector is updated by decrementing a designation variable n such as the next voltage vector V(n+1) by one (1). In addition, the current vector (id0, iq0) after passage of the required time period Ts is updated based on the instantaneous voltage vector (Δvd(n+1), Δvq(n+1)) calculated at step S16 and the required time period Ts calculated at step S18. This updating may be performed by using the equations (c7) and (c8).

When the processing of step S26 is completed or the check result at step S10 is negative, the above-described series of processing is finished.

According to the first embodiment, the time of passage of the required time period Ts can be set to the update timing by estimating the required time period Ts. It is however likely that the accuracy of estimation of the required time period Ts is degraded as the required time period Ts is increased. In case that the change in current is approximated linearly as calculated by the equations (c7) and (c8), the accuracy of estimation will be degraded more. Therefore, according to the first embodiment, the update timing is updated by re-calculating the required time period Ts at every control cycle period Tc having a predetermined time length.

Figure 4:
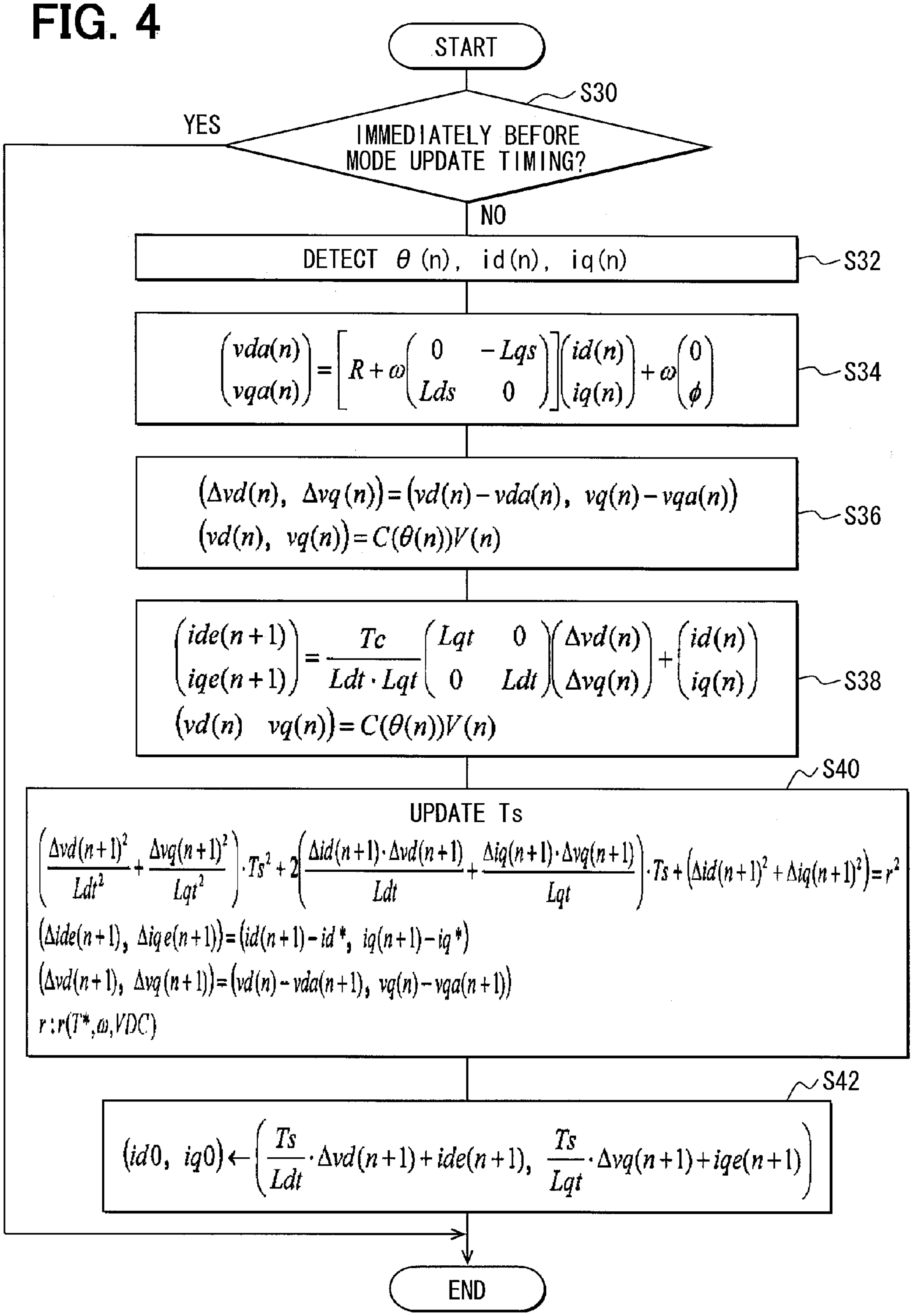
FIG. 4 is a flowchart showing model estimation control processing according to the first embodiment.

Steps of the update processing is shown in FIG. 4. This processing is repeated at every control cycle period Tc.

In this series of processing, it is first checked at step S30 whether it is immediately before the mode update timing. If the check result is negative, step S32 is executed. At step S32, the electric angle θ(n) and the actual currents id(n) and iq(n) are detected. At the following step S34, the average voltages vda(n) and Vq(n) are calculated based on the actual currents id(n) and iq(n). At step S36, the instantaneous voltages Δvd (n) and vq(n) are calculated based on the present voltage vector V(n) and the average voltages vda(n) and vqa(n). At the following step S38, the estimated currents ide(n+1) and iqe (n+1) after the control cycle period Tc are calculated. This processing may be executed based on equations similar to the equations (c7) and (c8). At step S40, the required time period Ts calculated previously is updated by estimating the required time period Ts relative to a time point, which is after the control cycle period Tc from the time of execution of step S32, as a reference time point. The required time period Ts indicates a period required for the norm of the difference vector between the command current and the current flowing in the motor/generator 10 reaches the threshold value r. At the following step S42, the currents id0, iq0 are calculated, as updated values of the currents id0 and iq0 calculated previously, at the time of elapse of the required time period Ts updated at step S40.

Figure 5:
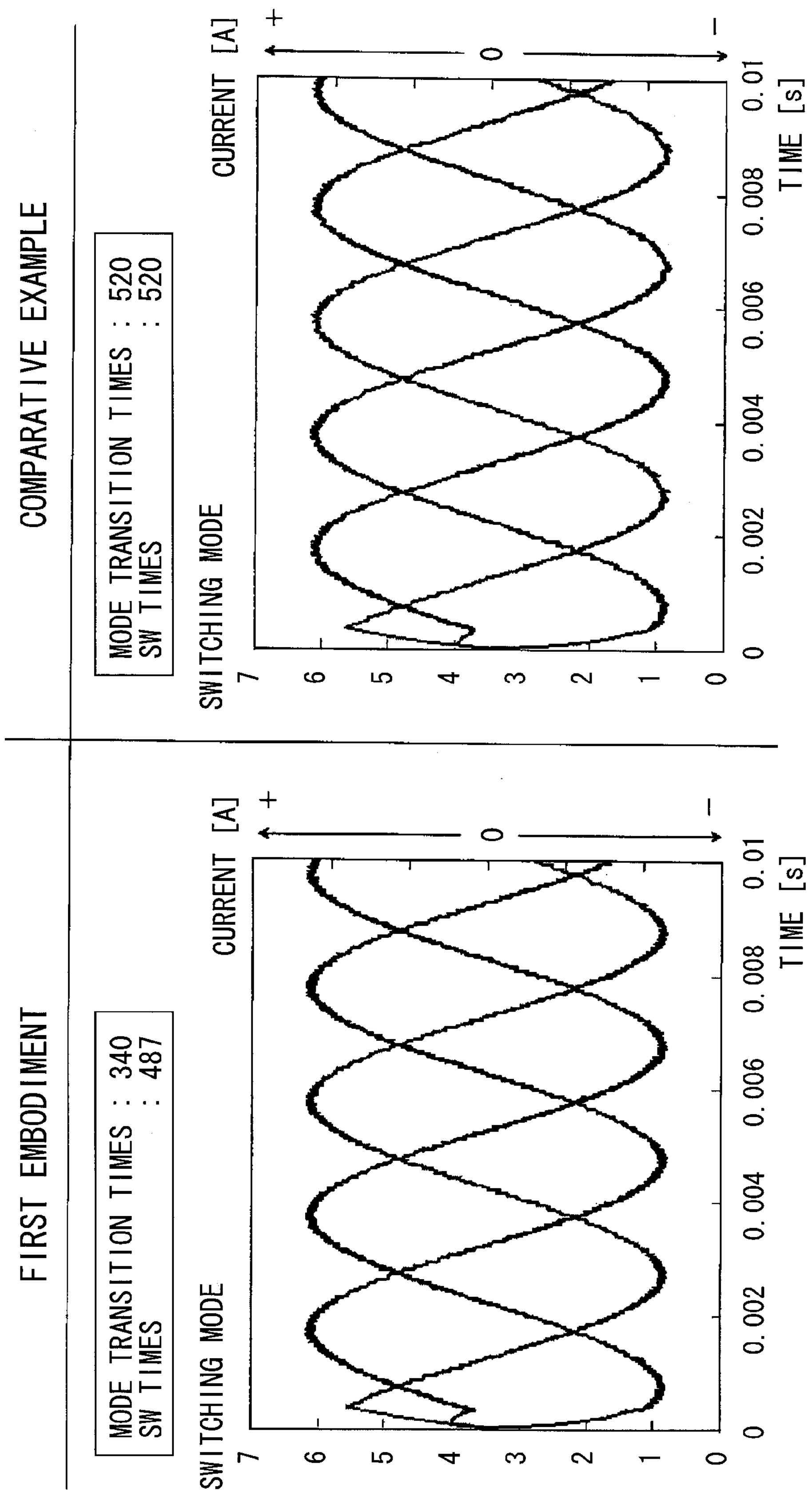
FIG. 5 is a time chart showing a result of comparison between the first embodiment and a comparative example.

FIGS. 5 to 9 show advantages of the first embodiment in comparison to a comparative example. As shown in FIG. 5, according to the first embodiment, the number of times of switching the switching state (SW times) and the number of transitions of the switching mode (mode transition times) are reduced in comparison to the comparative example. In this comparative example, a switching mode of a small change speed in an estimated current is adopted on condition that the difference between the actual currents id, iq and the command currents id*, iq* is less than the threshold value r to reduce the number of times of switching in the conventional model estimation control, which determines the switching mode updatable timing based on the control cycle period Tc.

Figure 6:
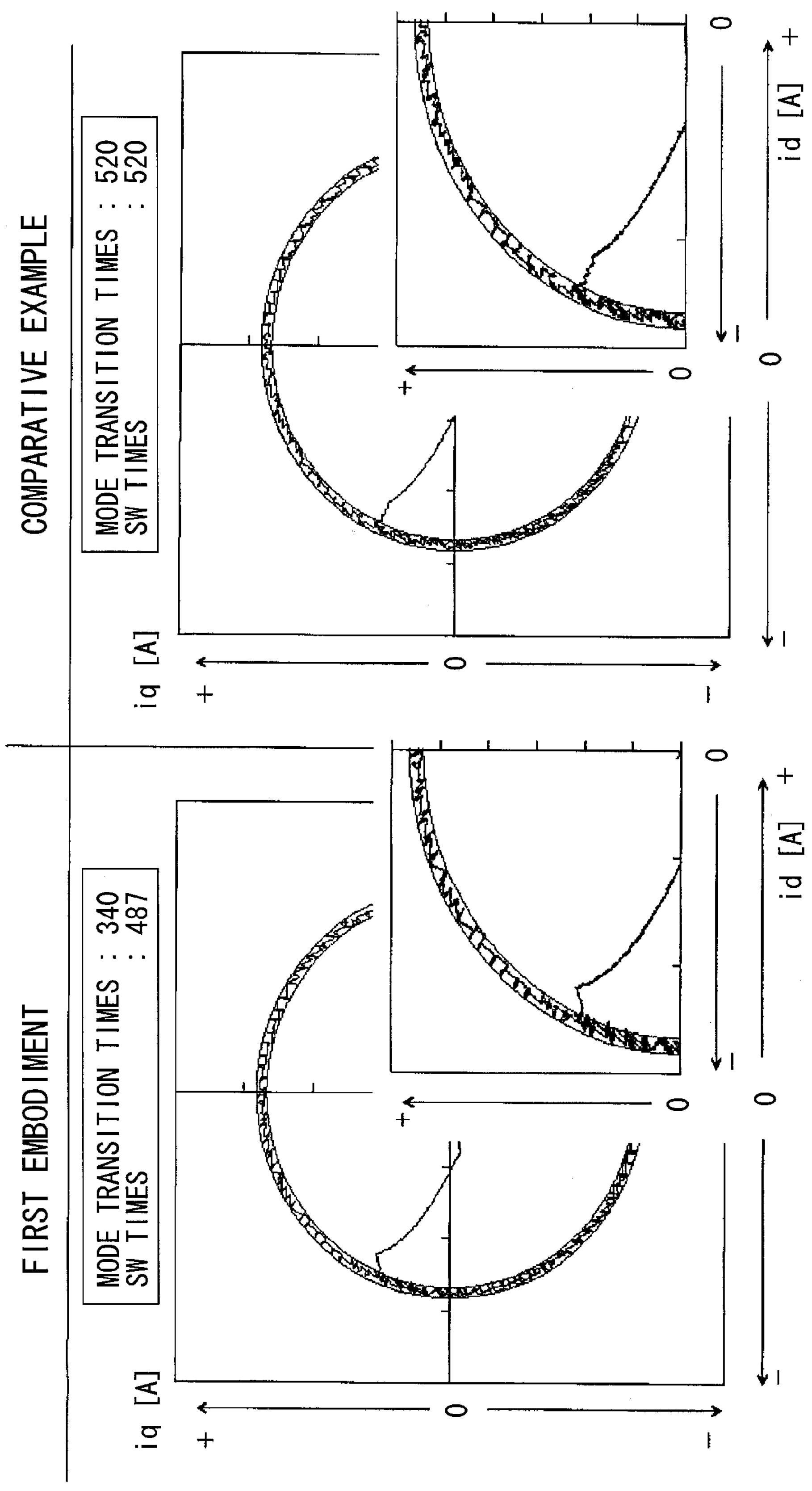
FIG. 6 is a diagram showing a result of comparison between the first embodiment and the comparative example.

FIG. 6 shows a range (area between a pair of coaxial circles of different diameters), in which the norm of the difference vector between the command current and the actual current attains the threshold value r, and behavior of the actual currents id and iq. As shown in FIG. 6, the first embodiment maintains the similar control performance as the comparative example described above. It is noted in this figure that the trajectory deviating from the above-described range is a transient trajectory, which the actual currents id and iq follow the command currents id* and iq* immediately after the control is started.

Figure 7:
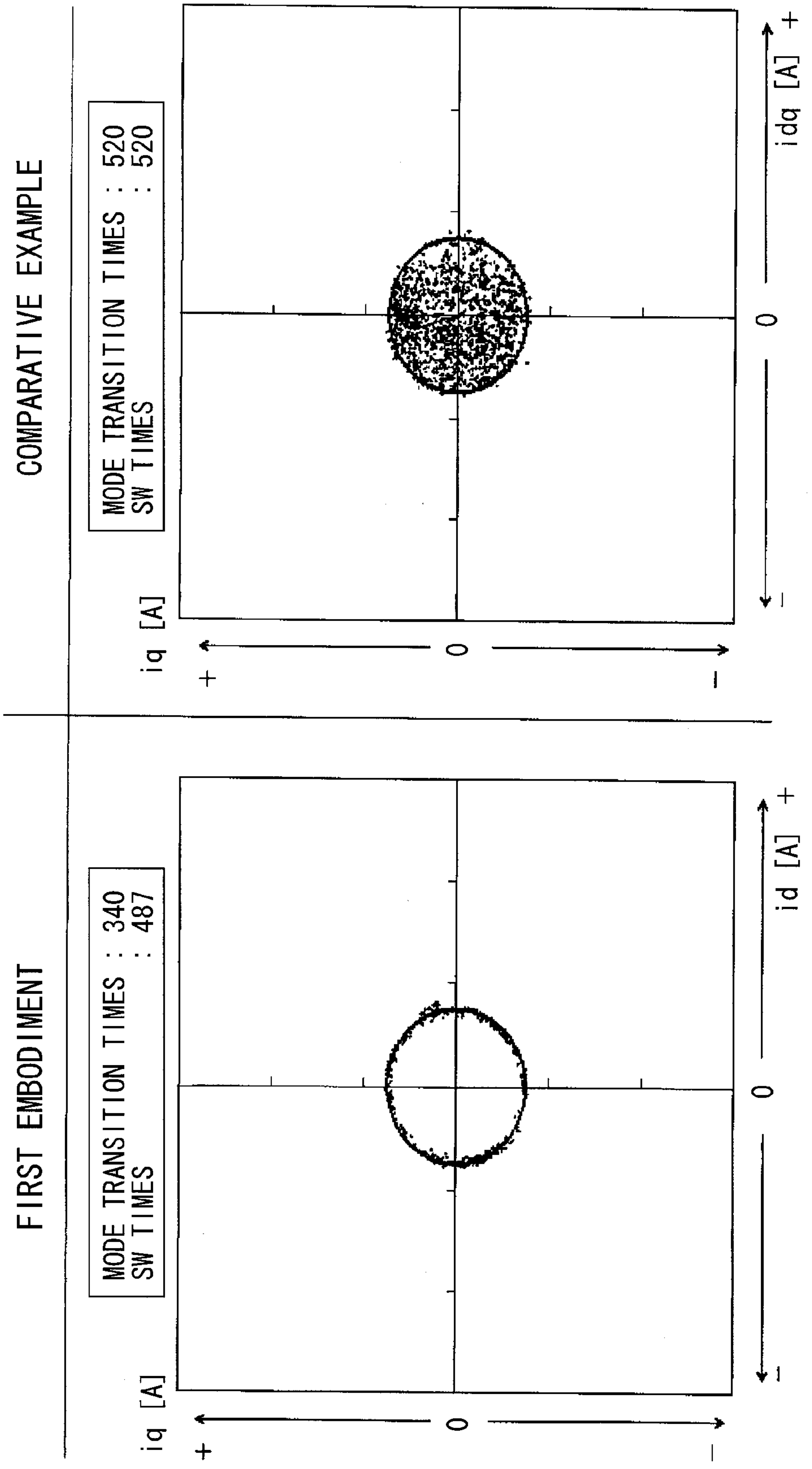
FIG. 7 is a diagram showing a result of comparison between the first embodiment and the comparative example.

FIG. 7 shows the actual currents id and iq at the updatable timing of the switching mode in a case that the origin point on the d-q axes is matched to the command currents. The circle shown in the figure has a radius, which is the same as the threshold value r. As shown in FIG. 7, according to the first embodiment, the switching mode is changed at a time point when the difference between the actual currents id, iq and the command currents id*, iq* attains the threshold value r. However, according to the comparative example, the switching mode can be changed at arbitrary current values at an elapse of the control cycle period Tc.

Figure 8:
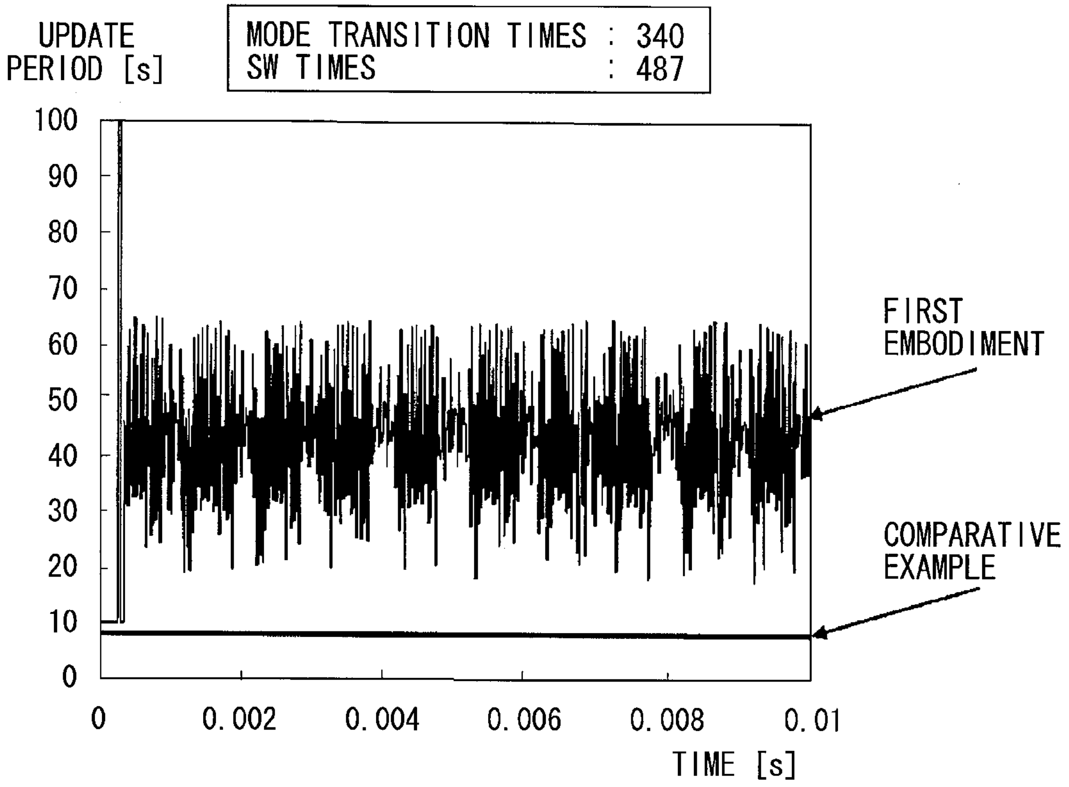
FIG. 8 is a time chart showing an advantage of the first embodiment.
Figure 9:
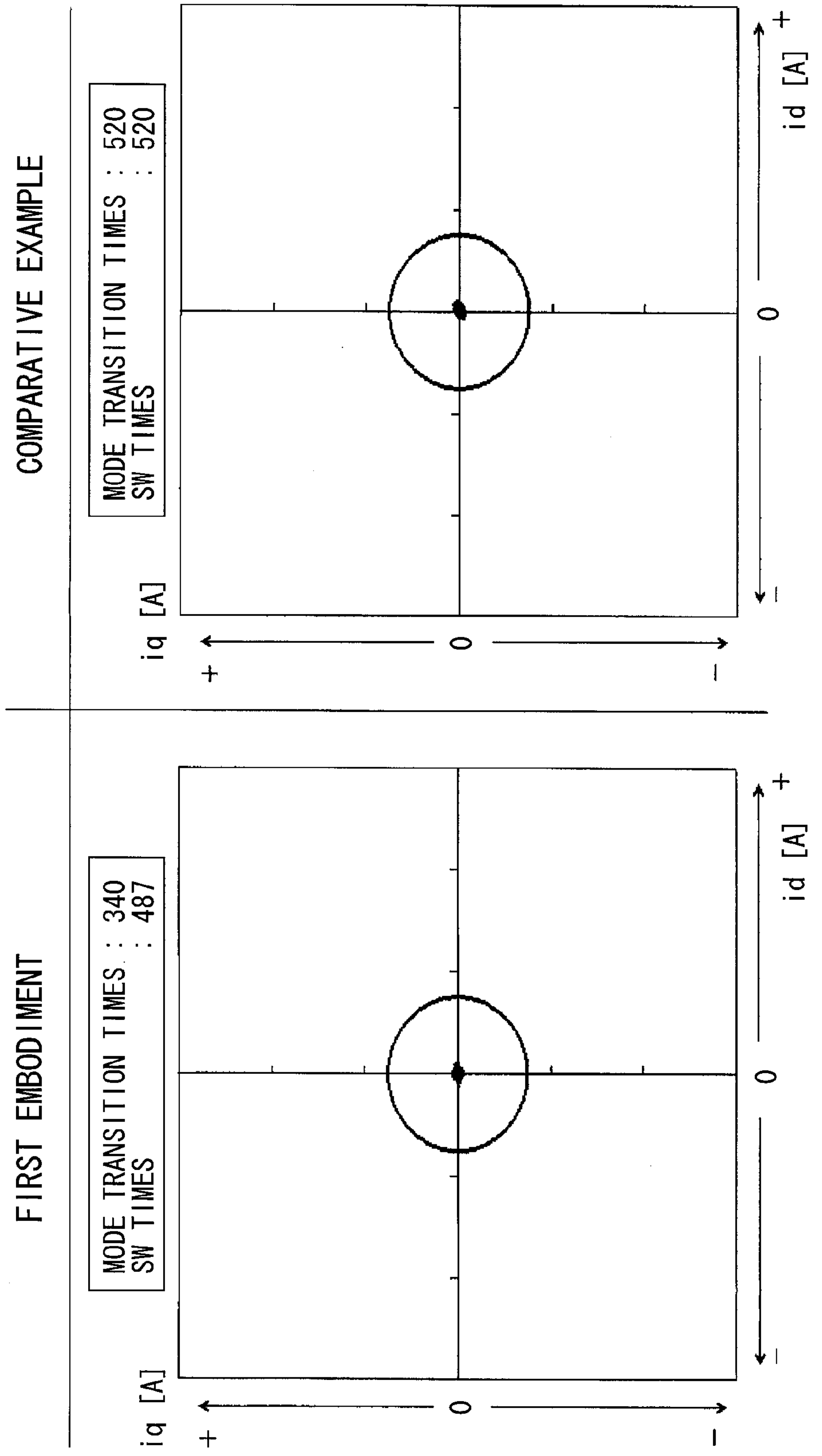
FIG. 9 is a diagram showing a comparison result between the first embodiment and the comparative example.

FIG. 8 shows the switching mode updatable timing. FIG. 9 shows estimated current values at the time of updating the switching mode. The estimated values are plotted with the actual current values at that time being positioned at the point of origin. The estimated error according to the first embodiment does not differ so much from that of the comparative example, although a time interval between the time of estimation (estimation calculation) and the time, about which time the current (id0, iq0) is estimated, is long.

According to the first embodiment, the following advantages are provided.

(a) The time period Ts required for the norm of the difference vector between the estimated currents ide, iqe and the command currents id*, iq* attains the threshold value r is estimated. The switching mode having the longest required time period Ts is adopted as the actual switching mode of the inverter 11. As a result, the number of times of switching the switching mode can be reduced.

(b) The threshold value r is set variably in accordance with the demand torque T*. As a result, the variation in ratio of the difference between the actual currents id, iq and the command current id*, iq* relative to the command current id*, iq* is reduced.

(c) The threshold value r is set variably in accordance with the electric angular velocity ω. As a result, the required time period Ts and the ratio of error can be adjusted appropriately.

(d) The threshold value r is set variably in accordance with the power supply voltage VDC. As a result, the required time period Ts and the ratio of error can be adjusted appropriately.

(e) The required time period Ts is updated at every interval of the control cycle period Tc. As a result, the required time period Ts can be made to be accurate.

Second Embodiment

A second embodiment will be described below about a difference from the first embodiment.

Figure 10A:
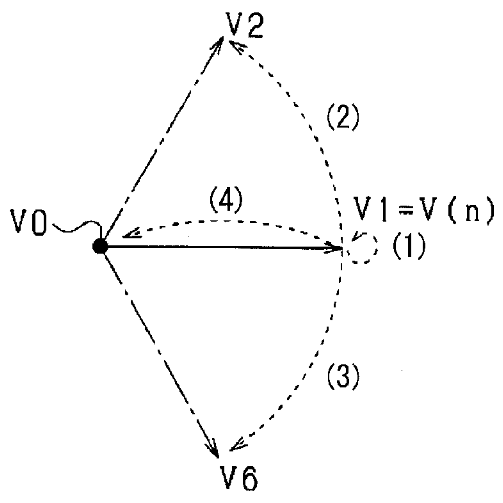
FIGS. 10A, 10B and 10C are diagrams showing provisionally set candidates of switching modes according to a second embodiment.
Figure 10B:
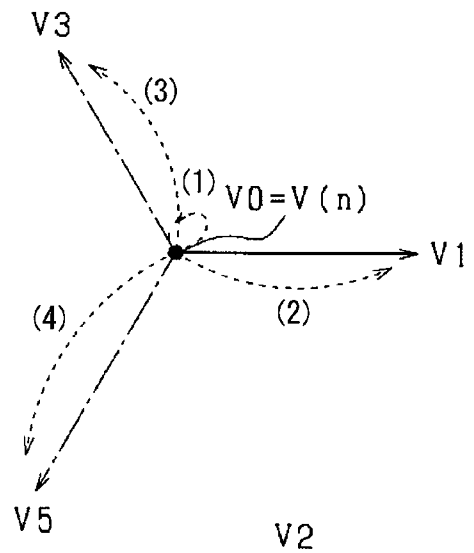
Figure 10C:
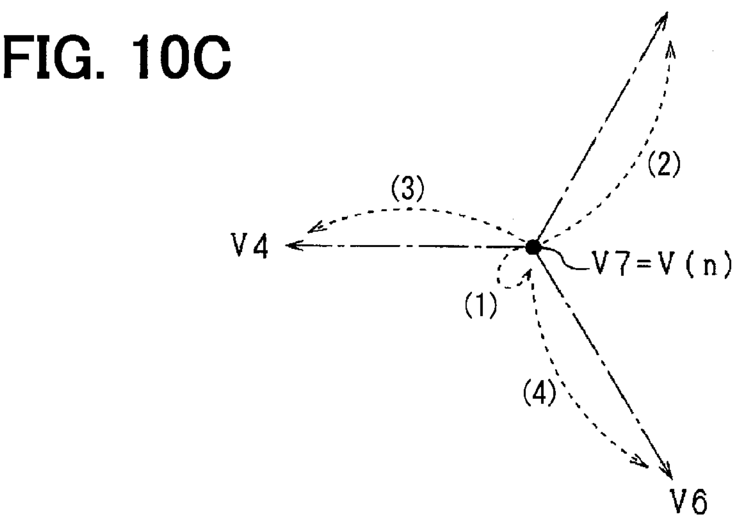

According to the second embodiment, the switching mode provisionally set at step S14 of FIG. 3 is limited to a case, in which the number of terminals of the motor/generator 10, the present switching mode is switched, is equal to 1 or less. Specifically, in a case that the voltage vector V(n) corresponding to the present switching mode is the effective voltage vector Vi (i=1 to 6), the voltage vector V(n+1) corresponding to the provisionally set switching mode to the voltage vectors Vi−1, Vi, Vi+1 (i: mode 6) or the zero voltage vector. However, if V(n)=V2$k$ (k=1 to 3), the voltage vector V7 is selected as the zero voltage vector. If V(n)=V2$k$−1, the voltage vector V0 is selected as the zero voltage vector. In FIG. 10A, four voltage vectors are shown as the voltage vector V(n+1), which is provisionally settable in case of V(n)=V1. If the voltage vector corresponding to the present switching mode is the zero voltage vector V0, the voltage vector V(n+1) corresponding to the provisionally set switching mode is set to the odd-numbered voltage vector V1, V3, V5 or the zero voltage vector V0 as shown in FIG. 10B. If the voltage vector V(n) corresponding to the present switching mode is the zero voltage vector V7, the voltage vector V(n+1) corresponding to the provisionally set switching mode is set to the even-numbered voltage vector V2, V4, V6 or the zero voltage vector V7 as shown in FIG. 10C.

FIG. 11 to FIG. 15 show advantages of the second embodiment relative to the first embodiment in the similar manner as FIG. 5 to FIG. 9, respectively.

Figure 11:
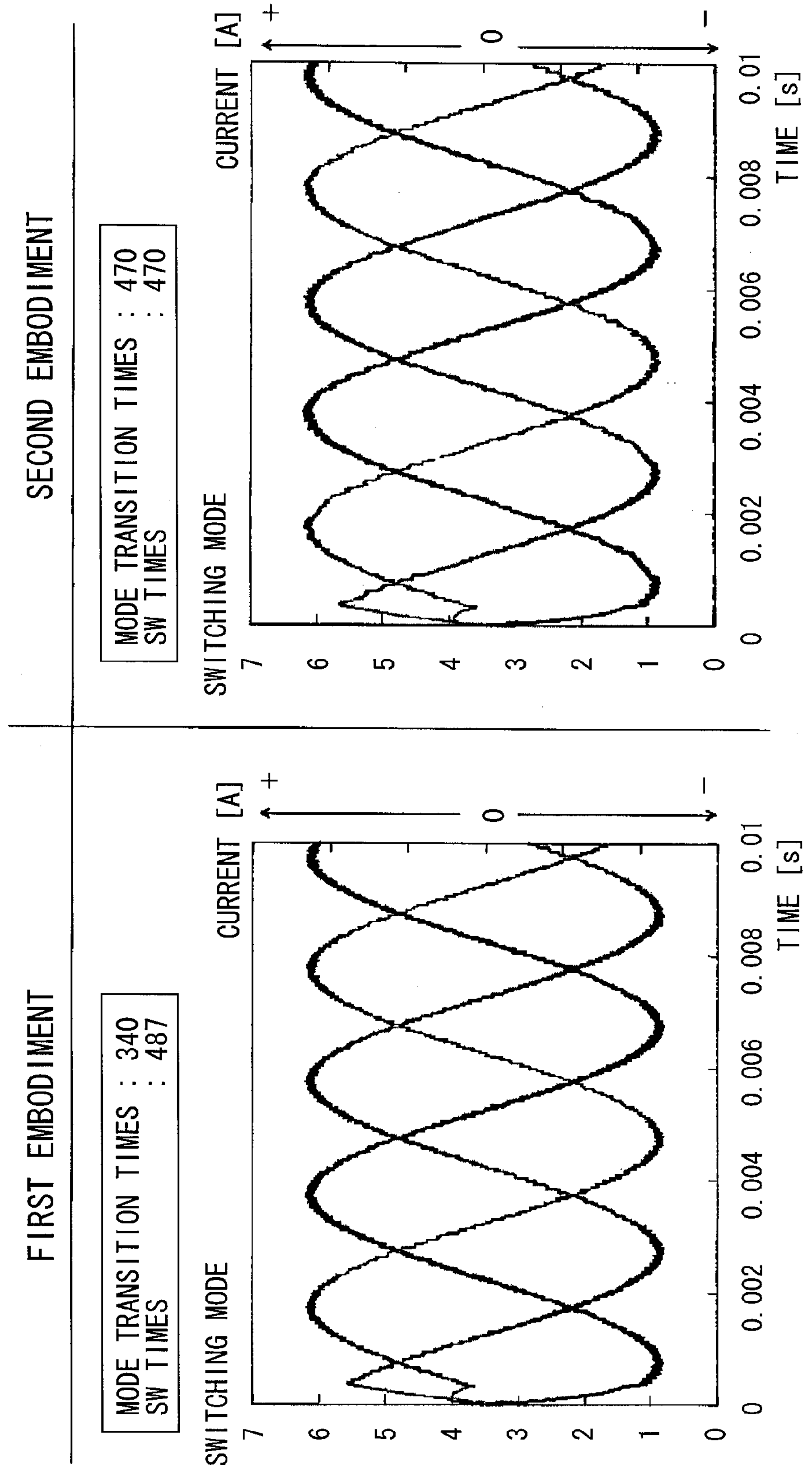
FIG. 11 is a time chart showing a result of comparison between the second embodiment and the first embodiment.
Figure 12:
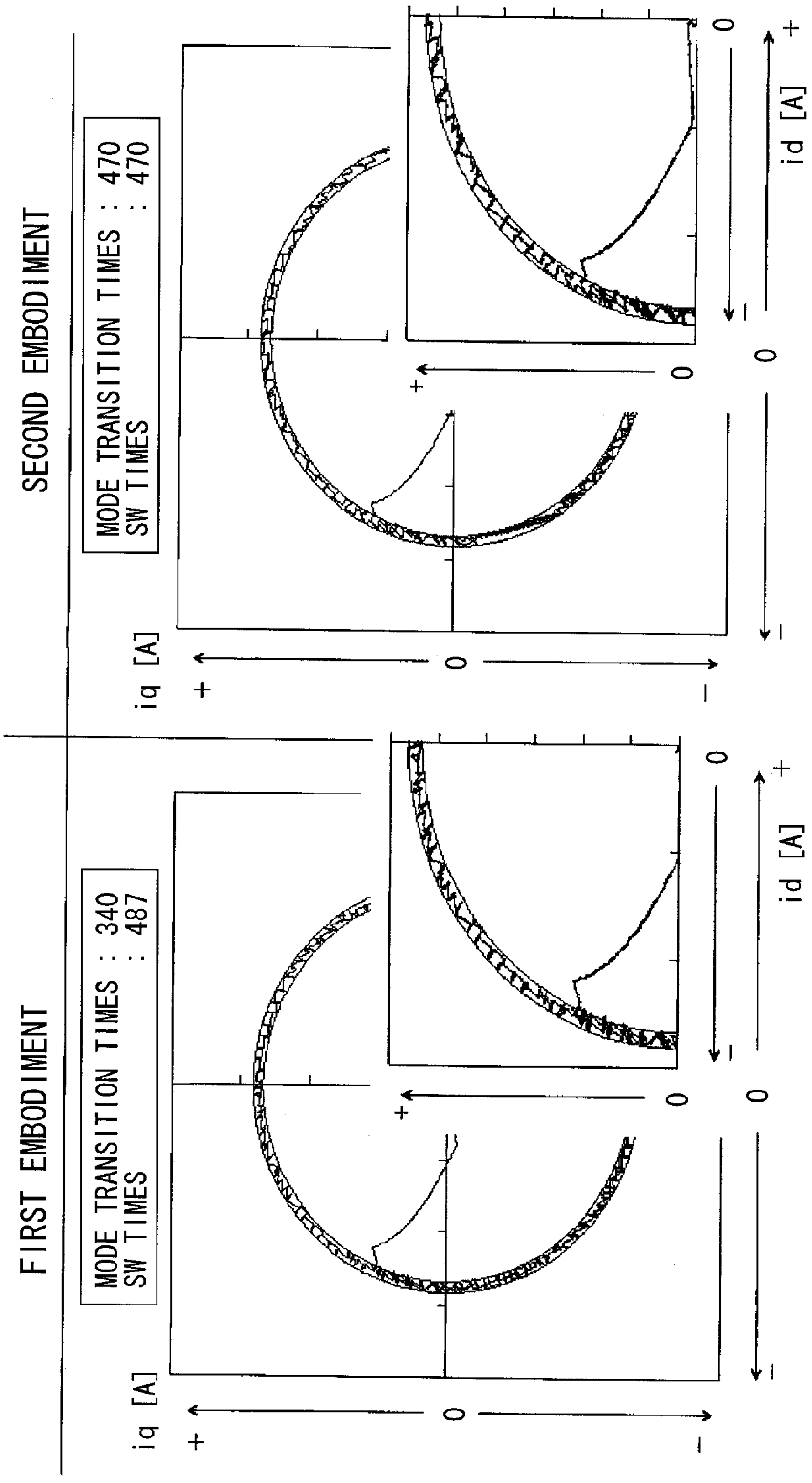
FIG. 12 is a diagram showing a result of comparison between the second embodiment and the first embodiment.
Figure 13:
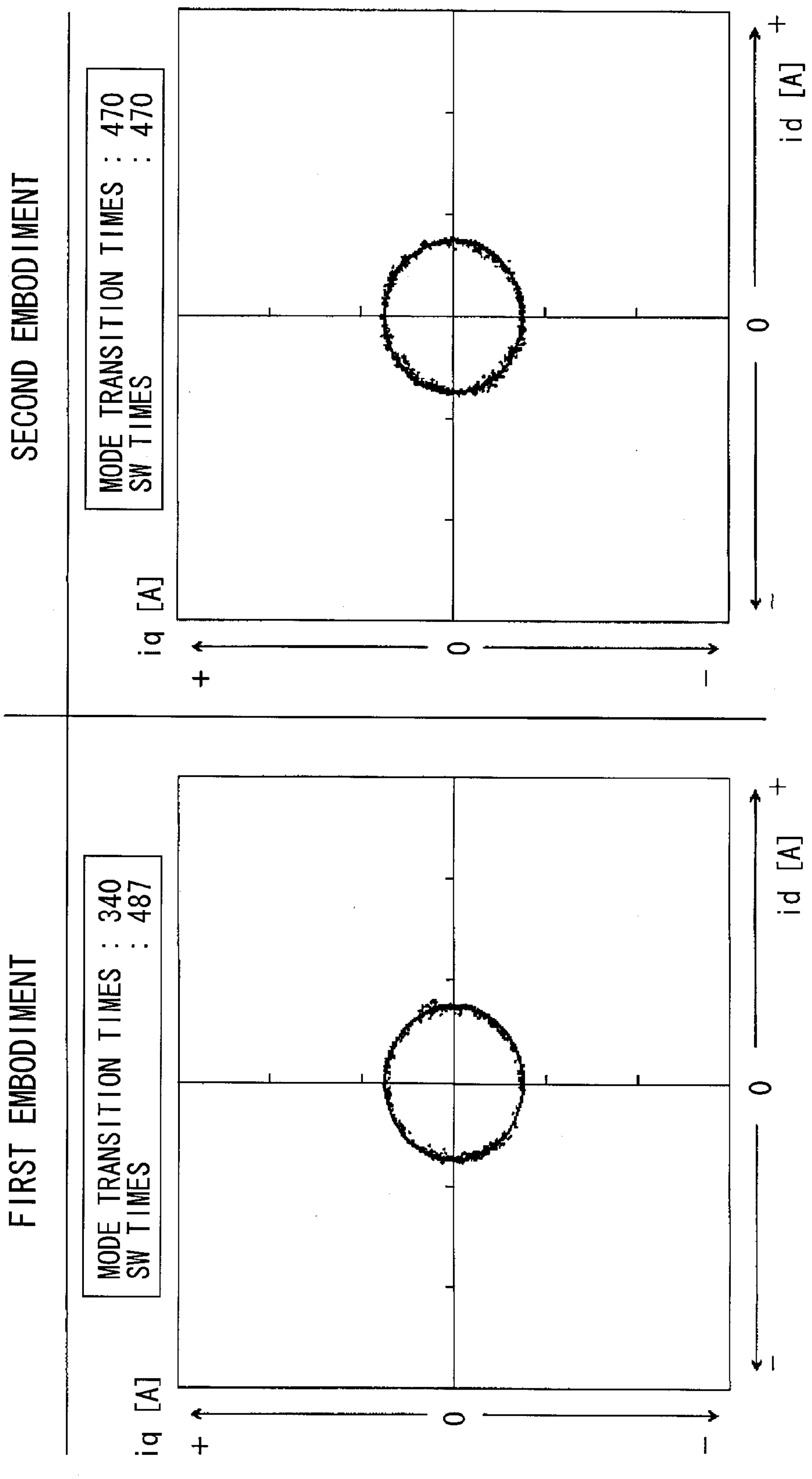
FIG. 13 is a diagram showing a result comparison between the second embodiment and the first embodiment.
Figure 14:
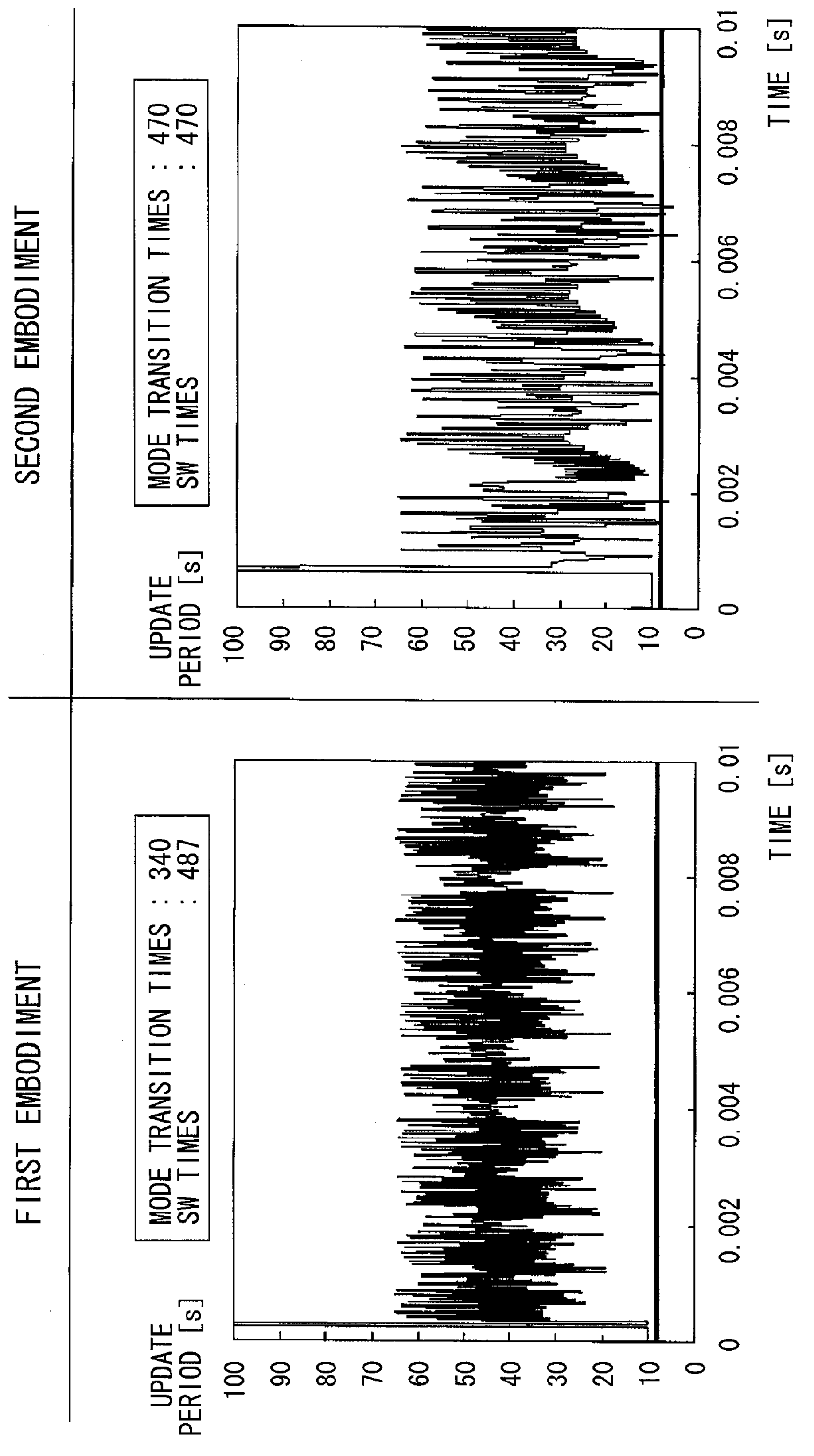
FIG. 14 is a time chart showing a result of comparison between the second embodiment and the first embodiment.
Figure 15:
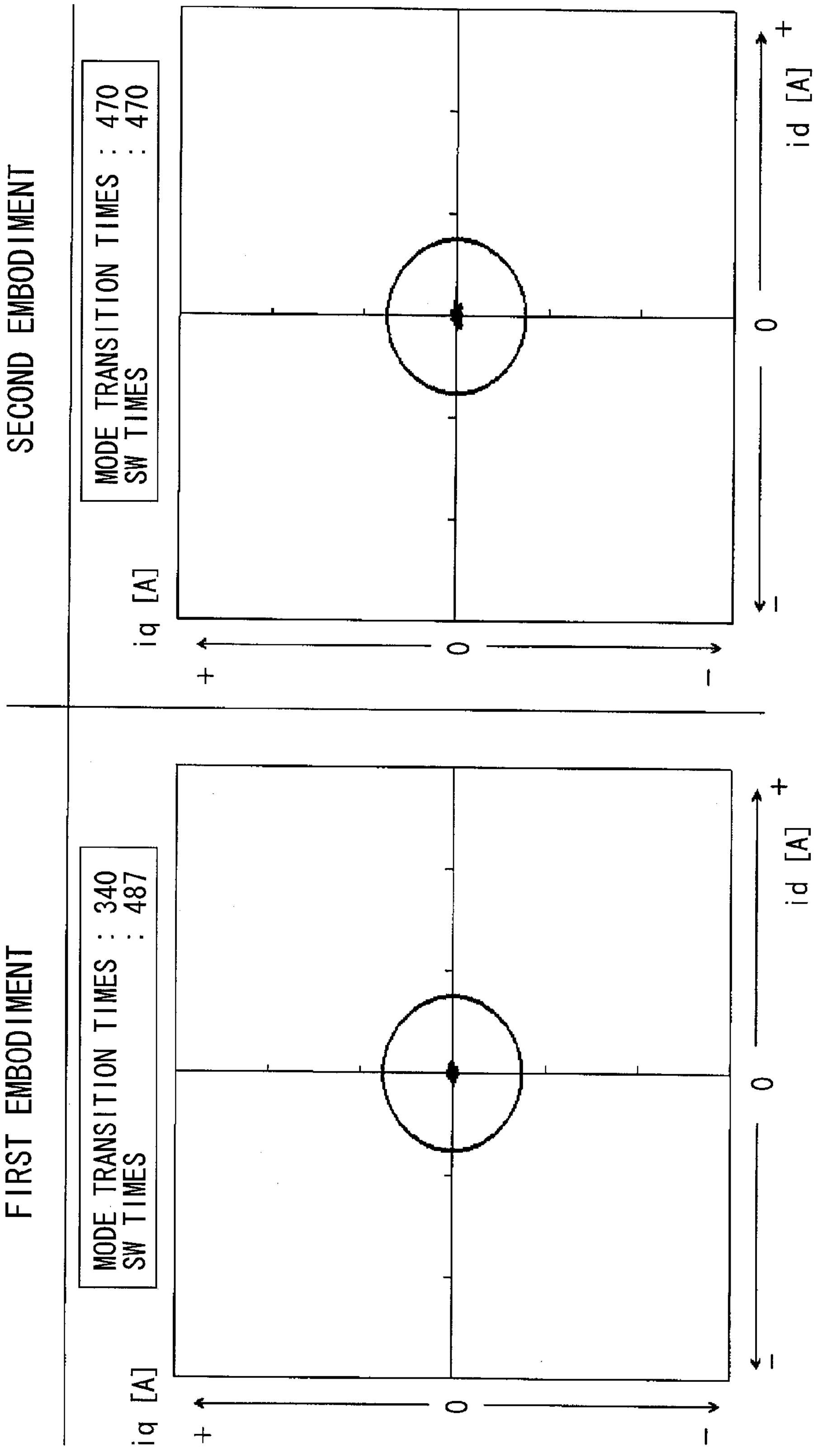
FIG. 15 is a diagram showing a result of comparison between the second embodiment and the first embodiment.

As shown in FIG. 11, according to the second embodiment, the number of switching of the switching state is generally the same (or slightly reduced) although the number of transition of the switching mode increases to be more than in the first embodiment. The control performance is not degraded as shown in FIG. 12, FIG. 13 and the like. It is thus possible to reduce surge voltages generated at the time of switching of the switching state without lowering the control performance.

Third Embodiment

A third embodiment will be described below about a difference from the first embodiment.

Figure 16:
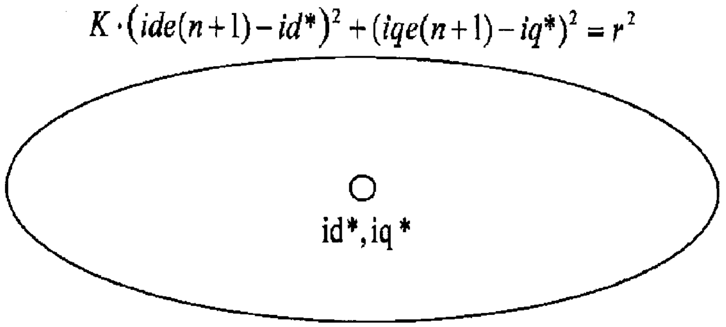
FIG. 16 is a diagram showing a permitted range according to a third embodiment.

FIG. 16 shows a range, in which the degree of deviation (difference) from the command currents id* and iq* in the third embodiment becomes less than a predetermined value. As shown in the figure, according to the third embodiment, the time period, in which the actual currents id and iq remain in a range surrounded by an ellipse having its center at the command currents id* and iq*, is calculated as the required time period Ts. This may be realized by equalizing, to a square of the threshold value r, a weighted average values of a square of the difference between the estimated current ide (n+1) and the command current id* and of a square of the difference between the estimated current iqe(n+1) and the command current iq*. In FIG. 16, the ellipse is exemplified as an ellipse (longitudinal axis direction corresponds to d-axis direction), which indicates that deviation of a component in the d-axis direction is more permissible, that is, the permitted amount of deviation from the command current id* is larger. This is because the ellipse is exemplified as having an operation point, at which the change amount of the d-axis current per unit time is larger than the change amount of the q-axis current.

Fourth Embodiment

A fourth embodiment will be described below about a difference from the first embodiment.

Figure 17:
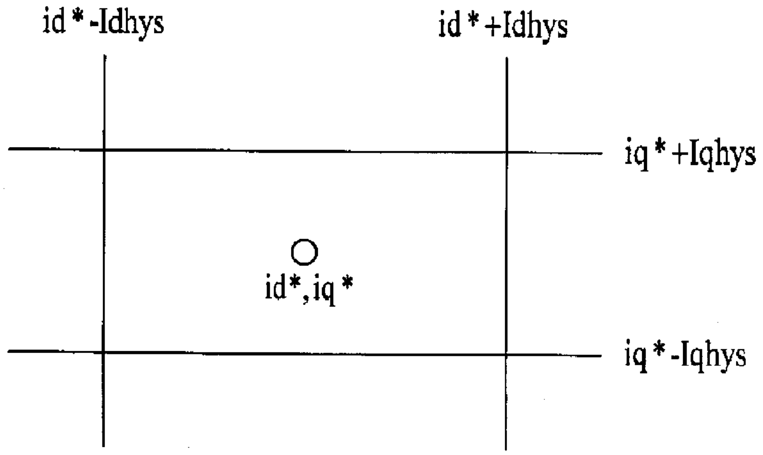
FIG. 17 is a diagram showing a permitted range according to a fourth embodiment.

FIG. 17 shows a range, in which the degreed of deviation from the command currents id* and iq* according to the fourth embodiment is smaller than a predetermined value. As shown in the figure, the time period, in which the actual currents id and iq remain in a range surrounded by a rectangle having its center at the command currents id* and iq*, is calculated as the required time period Ts. That is, the required time period Ts is calculated as the time period, in which the amount of deviation from the command current id* in the d-axis direction remains equal to or smaller than Idhys (that is, between +Idhys and −Idhys) and the amount of deviation from the command value iq* in the q-axis direction remains equal to or smaller than Iqhys (that is, between +Iqhys and −Iqhys).

Fifth Embodiment

A fifth embodiment will be described below about a difference from the fourth embodiment.

Figure 18:
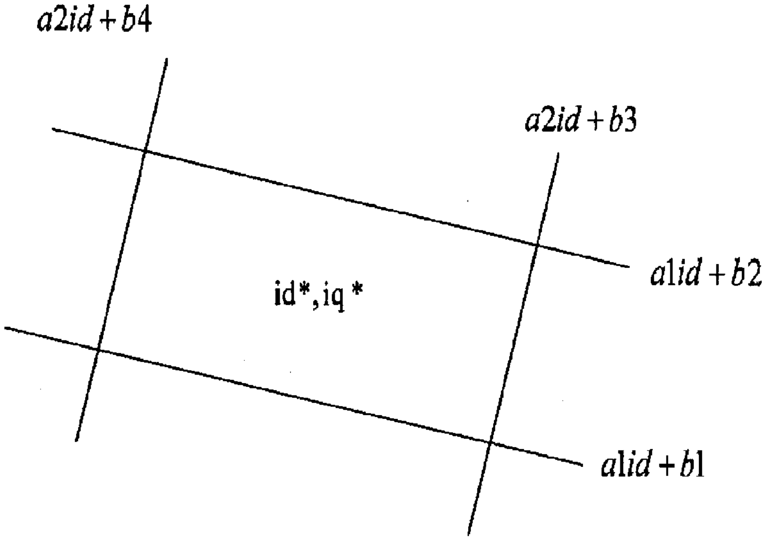
FIG. 18 is a diagram showing a permitted range according to a fifth embodiment.

According to the fifth embodiment shown in FIG. 18, an angle of a straight line is set variably. This straight line crosses at two points a boundary of a range defining an upper limit of the amount of deviation of the actual currents id and iq from the command currents id* and iq* and maximizes a distance between the two crossing points. This variable setting is for further reducing the number of times of switching of the switching mode by lengthening as much as possible the time period of remaining in the switching mode 0 and 7 corresponding to the zero voltage vector V0 and V7 in a range such as a low rotation velocity range, for example, in which the rate of voltage use is low. That is, when the rate of voltage use is low, the absolute value of the change speed of the actual currents id and iq tends to decrease in case of adopting the zero voltage vectors V0 and V7 in comparison to a case of adopting the effective voltage vectors V1 to V7. Therefore, when the trajectory of changes in the actual currents id and iq in case of adopting the zero voltage vectors V0 and V7 matches the straight line of the above-described maximization, the number of times of switching the switching mode will be reduced appropriately. Based on this point, the inclination of the straight is matched to the direction of change in the actual currents id and iq provided when the zero voltage vectors V0 and V7 are adopted.

FIG. 18 shows a range, in which the degree of deviation from the command currents id* and iq* according to the fifth embodiment becomes equal to or smaller than a predetermined value.

As shown in the figure, the above-described range is defined as a range, which is surrounded by the following four equations.

$$id=a1\cdot id+b1 \tag{c10}$$

$$id=a1\cdot id+b2 \tag{c11}$$

$$iq=a2\cdot iq+b3 \tag{c12}$$

$$iq=a2\cdot iq+b4 \tag{c13}$$

Here, the gradient (proportional constant) a1 and the gradient a2 are set to cross perpendicularly, and the gradient a1 determines the direction of change of the current at the time of adopting the zero voltage vectors V0 and V7. Since the gradient a1 is (diq/dt)/(did/dt), it is calculated by substituting the inverted average voltage vector (vda, vqa) for the instantaneous voltages Δvd and Δvq of the equations (c5) and (c6). That is, it is calculated by the following equation (c14).

$$a1=Ldt\cdot(R\cdot iq+\omega\cdot Lds\cdot id+\omega\cdot\phi)/\{Lqt\cdot(R\cdot id-\omega\cdot Lqs\cdot iq)\} \tag{c14}$$

Figure 19:
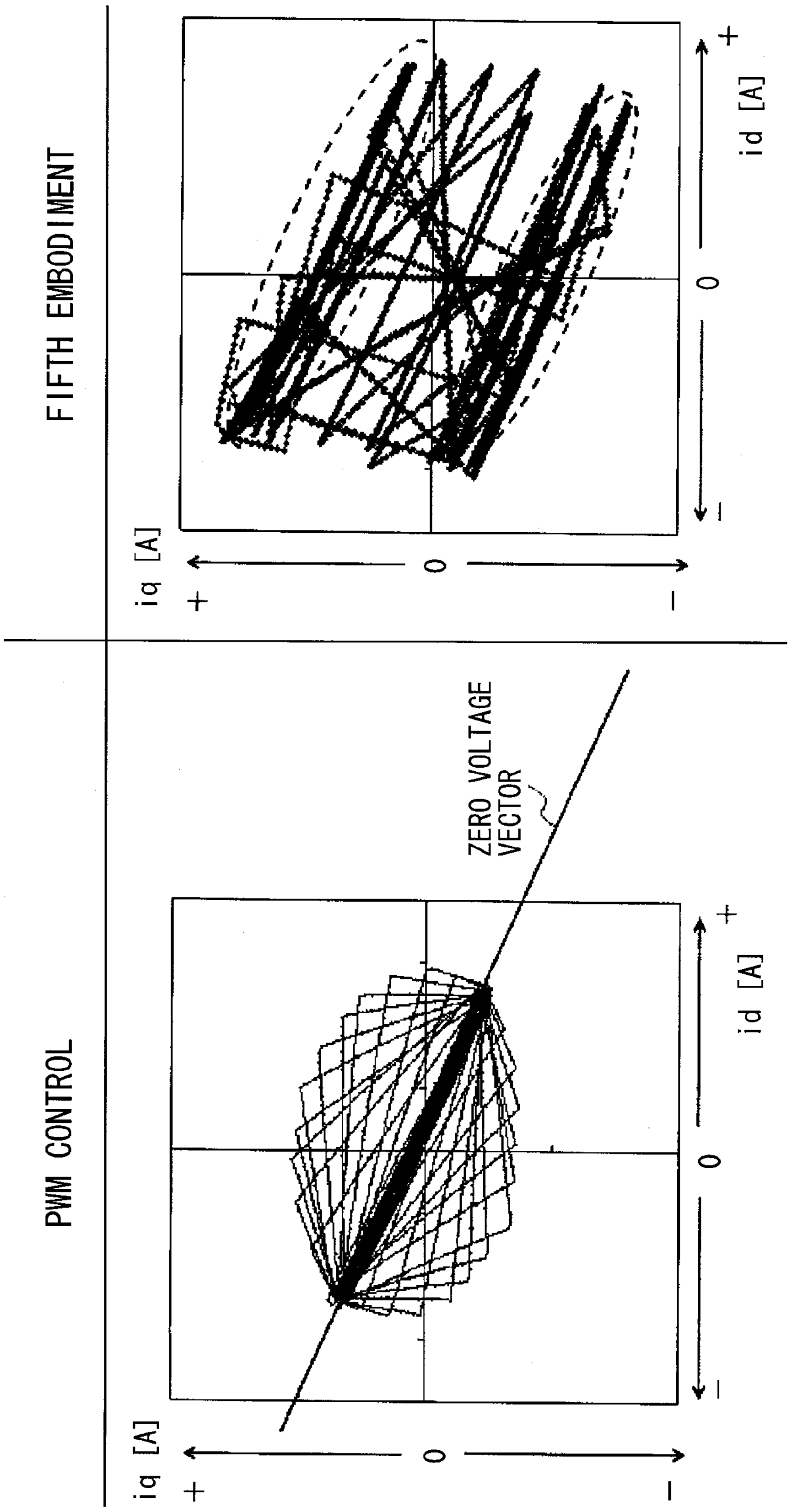
FIG. 19 is a diagram showing a result of comparison between the fifth embodiment and a comparative example of PWM control.
Figure 20:
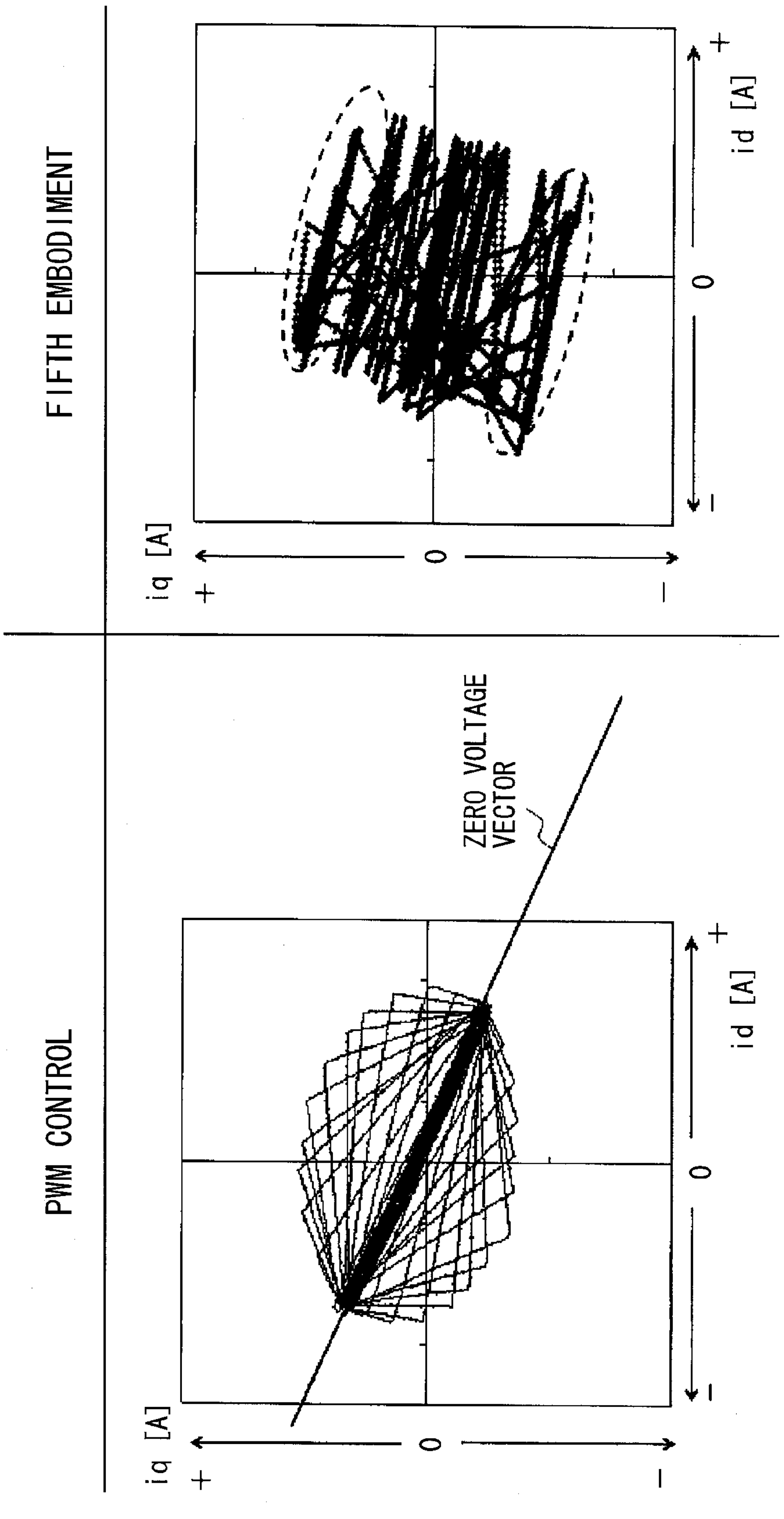
FIG. 20 is a diagram showing a result of comparison between the fifth embodiment and the comparative example of PWM control.

FIG. 19 and FIG. 20 show advantages of the fifth embodiment. In FIG. 19 and FIG. 20, left side, current behaviors in case of adopting the zero voltage vectors V0 and V7 in the triangular wave comparison PWM control processing (PWM control) are shown, respectively. In the triangular wave comparison PWM control processing, the zero voltage vectors V0 and V7 are adopted during a predetermined period determined by comparison of the command voltage and a carrier wave. In the subsequent period of adopting the effective voltage vector, the current changes by the generally same amount as that of adopting the zero voltage vectors V0 and V7 but in the opposite polarity. According to the fifth embodiment shown in right side in FIG. 19 and FIG. 20, the trajectory of current changes in case of adopting the zero voltage vectors V0 and V7 is made to match generally that of the triangular wave comparison PWM control processing although it is not identical to that of the triangular wave comparison PWM control processing.

Figure 21:
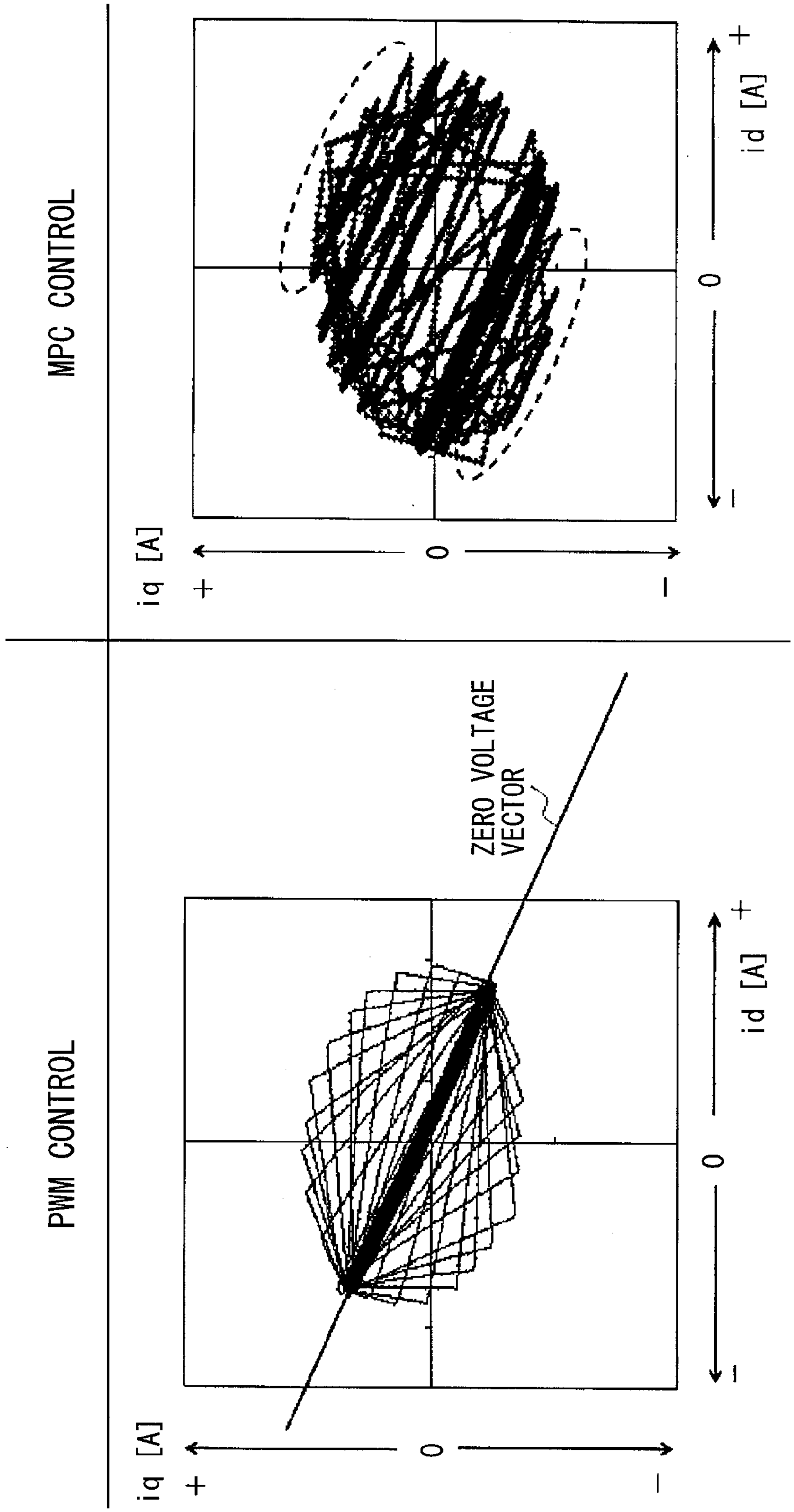
FIG. 21 is a diagram showing a result of comparison between MPC control processing and the comparative example of PWM control, and a problem to be solved by the fifth embodiment.
Figure 22:
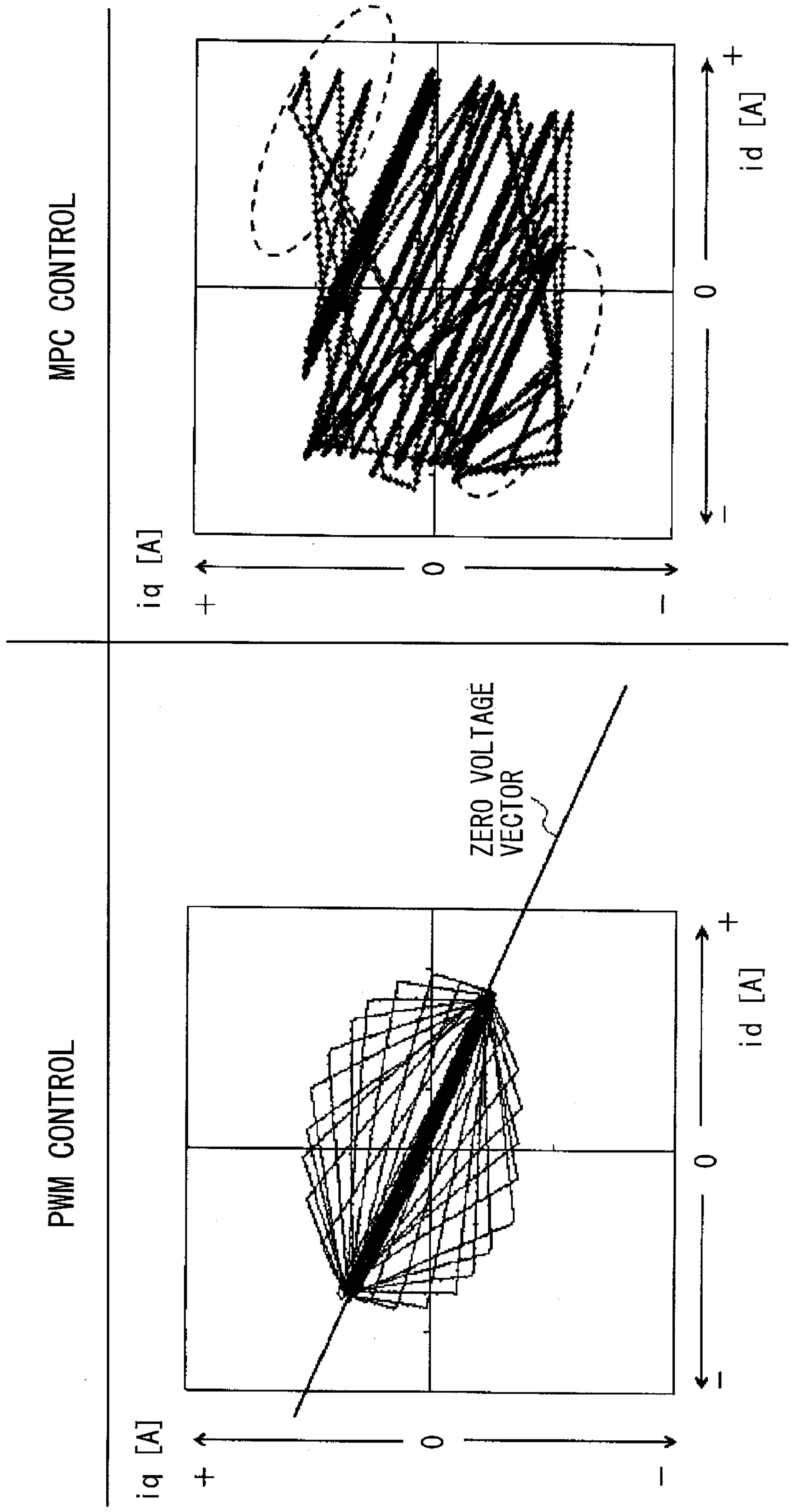
FIG. 22 is a diagram showing a result of comparison between the MPS control processing and the comparative example of PWM control, and a problem to be solved by the fifth embodiment.

FIG. 21 and FIG. 22 show trajectories of currents occurring in the fourth embodiment.

Sixth Embodiment

A sixth embodiment will be described below about a difference from the first embodiment.

According to the sixth, the switching mode is switched to the mode, in which the degree of deviation from the command currents id* and iq* is minimized when it is predicted that the degree of deviation from the command values id* and iq* will exceed the predetermined value continuously for a long time period.

Figure 23:
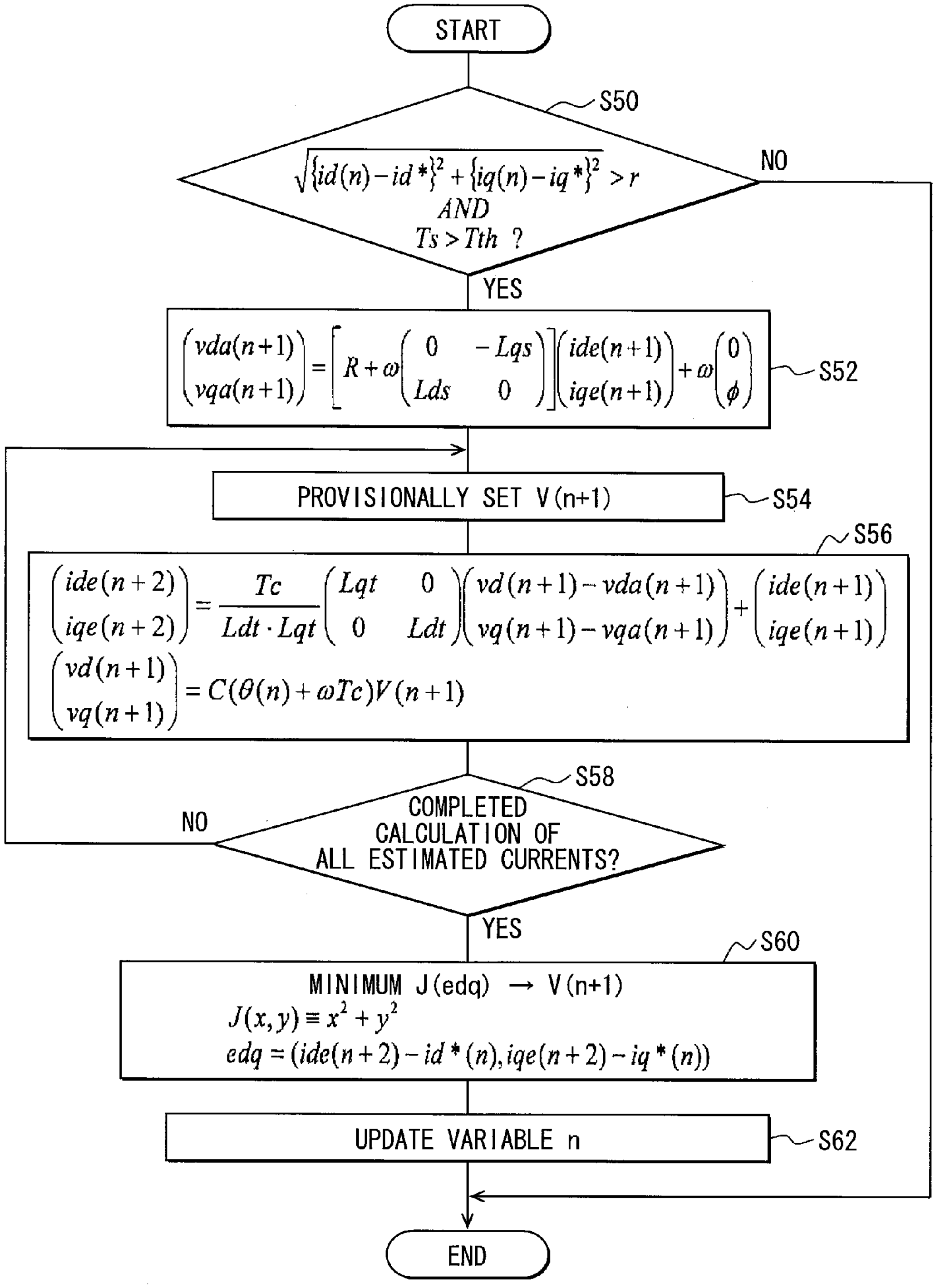
FIG. 23 is a flowchart showing model estimation control processing according to a sixth embodiment.

FIG. 23 shows steps of switching processing, which is repeated at every control cycle period Tc, for example.

In this series of steps, it is checked first at step S50 whether the norm of the difference vector between the actual current vector (id(n), ig(n)) detected at step S32 in FIG. 4 and the command current vector (id*, iq*) is larger than the threshold value r and the required time period Ts is longer than a limit time period Tth. This processing is executed for checking whether it is time to switch to the switching mode, which minimizes the degree of deviation from the command currents id* and iq*. In a case that the required time period Ts exceeds the upper limit period Tth, the quadratic equation of the required time period Ts expressed by the equation (c9) becomes negative and no solution for the required time period Ts is available.

At the following step S52, an average voltage vector (Vda (n+1), Vqa(n+1)) is calculated based on the estimated currents ide(n+1) and iqe(n+1) calculated at step S38 of FIG. 4. At the subsequent steps S54 to S58, the estimated currents ide(n+2) and iqe(n+2) are calculated for each of the switching modes 0 to 7. Here, the estimated currents ide(n+1) and iqe(n+2) is set as the estimated values of the current, which flow after an elapse of the control cycle period Tc from the adoption of the switching mode set provisionally. At the following step S60, the switching mode (voltage vector V(n+1)) is determined. Here, the voltage vector having the highest evaluation by an evaluation function J is set as a final voltage vector V(n+1). The evaluation function J lowers its evaluation result as a difference in each component of the command current vector and the estimated current vector. According to the sixth embodiment, an evaluation function J, which outputs a larger value in correspondence to a lower evaluation, is adopted. Specifically, the evaluation function J is calculated based on an inner product value of a difference between the command current vector (id*, iq*) and the estimated current vector (ide, iqe). This is one method of expressing that the larger value indicates the lower evaluation in consideration that a difference of each component between the command current vector and the estimated current vector possibly become positive and negative.

It is noted that the estimated currents ide(n+2) and iqe(n+2) are calculated with respect to each of the switching modes 0 to 7, at the time when it is determined affirmatively at step S58. For this reason, eight evaluation values of the evaluation function are calculated by using eight estimated currents ide (n+2) and iqe(n+2).

At the following step S62, a designation variable n of the sampling number of the voltage vector, the current and the electric angle is corrected by decrementing one each time. Thus, the designation variable n is updated and the series of processing is finished.

Seventh Embodiment

A seventh embodiment will be described below about a difference from the first embodiment.

According to the seventh embodiment, the switching mode, the required time period Ts of which corresponds most closely to a target time period Tt, is selected. This is for controlling the switching frequency. Thus, tone of noises and the like can be controlled by controlling sound pressure distribution in an audio frequency band for example.

Figure 24:
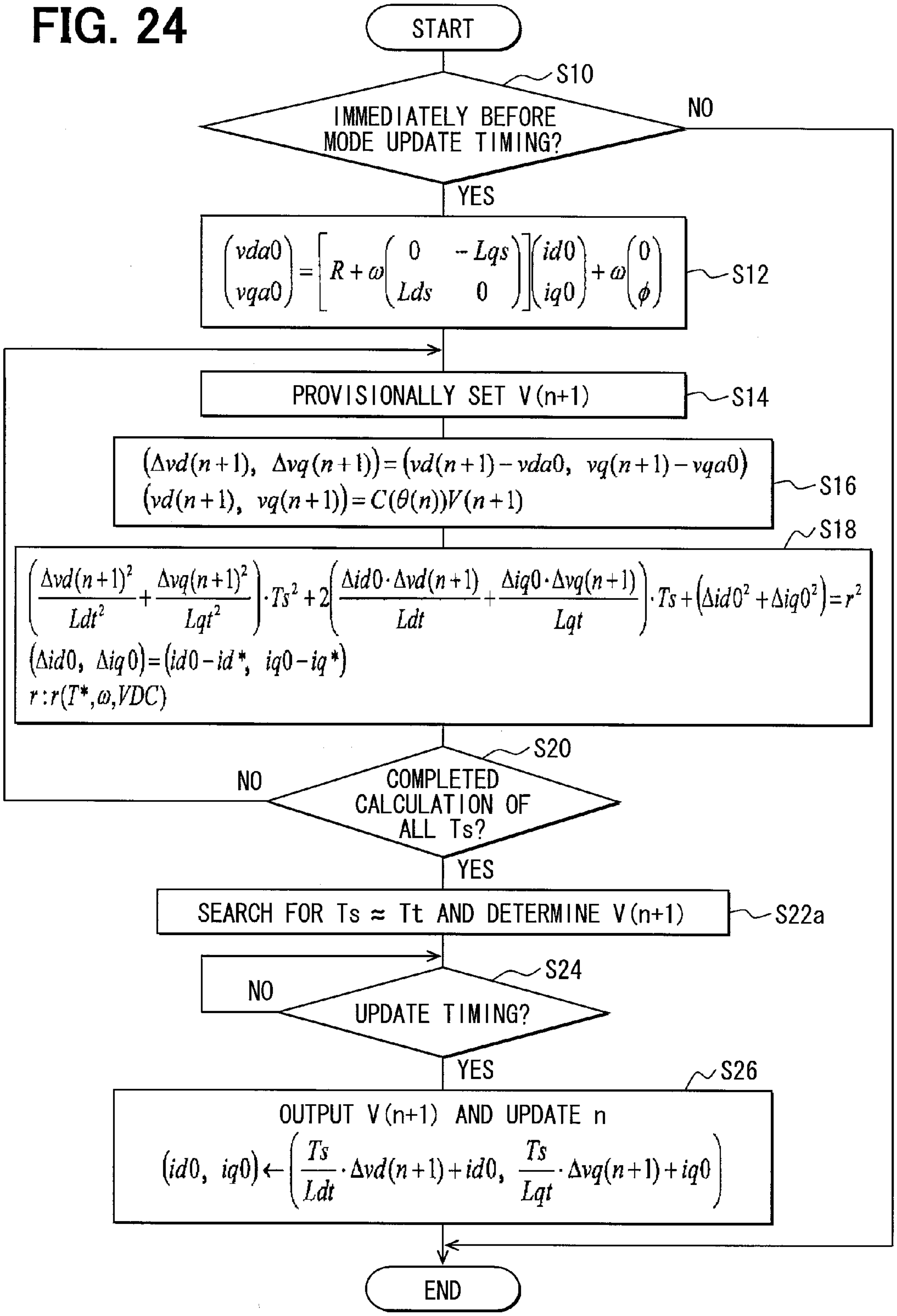
FIG. 24 is a flowchart showing model estimation control processing according to a seventh embodiment.

FIG. 24 shows processing steps of model estimation control according to the seventh embodiment. This processing is repeated at every predetermined interval. In FIG. 24, same step numbers are assigned to corresponding steps shown in FIG. 3 for brevity.

In a series of steps of this processing, if the check result at step S20 is affirmative, a voltage vector, which minimizes the absolute value of the difference between the required time period Ts and the target time period Tt, among the voltage vector V(n+1) set provisionally at step S14 is determined to be the final voltage vector V(n+1). Here, the target time period Tt is a parameter for controlling the switching frequency to a desired value. By setting the target time period Tt, the switching frequency can be controlled. As a result, the sound pressure distribution and the switching loss caused by the switching operation can be controlled.

Other Embodiments

The above-described embodiments may be modified as follows.

[Determination Section]

For example, an absolute value of an output of an integral term of a difference between the command currents id* and iq* and the actual currents id and iq may be calculated and multiplied by a weighting coefficient. A length of time of deviating from the permissible range may also be multiplied by a weighting coefficient. These two weighted values may be added. The switching mode may be determined to a mode, in which the addition valued (weighted average value) is most minimized. Thus, the deviation of the actual currents id and iq from the command currents id* and iq* appearing steadily can be reduced.

[Update Timing Setting Section]

For example, the update timing may be set to an earlier one of the time of elapse of the required time period Ts and the time, at which the actual currents id and iq changes from an inside to an outside of the permissible range.

[Range Varying Section]

The parameter, which has a correlation with the absolute value of the control amount defining the permissible range, is not limited to the demand torque T*. It may be a torque estimated from the actual currents id and iq or the actual currents id and iq. It may be the estimated currents ide and iqe, or a torque, which is estimated from the estimated currents ide and iqe.

The parameter having the correlation with the length of time, in which the control amount deviates from the boundary of the permissible range, is not limited to the electric angular velocity ω and the power supply voltage VDC. It may be any one of those.

The number of parameters used to variably set the permissible range is not limited to three.

[Angle Varying Section]

This is not limited to a section, which sets in parallel to the side of the rectangle the direction vector of the actual current change when the switching mode corresponds to the zero voltage vector. For example, the angle formed between the long side and the change direction vector may be less than 45° (more preferably less than 10°). Even in this case, the time period, in which the switching mode expressed by the zero voltage vector is adopted, can be prolonged.

The permissible range, which is a subject of varying angle, is not limited to the rectangle but may be ellipse or the like. In a case that the ellipse is adopted, the angle formed by the elongated axis and the change direction vector may be set to be less than 45° (more preferably parallel). In the permissible range effective as an application subject of the angle varying section, the distances of a plurality of straight lines crossing a point, which does not differ from the command value, between a pair of crossing points with the permissible range differ one another.

The parameter for variably setting the angle is not limited to the electric angular velocity ω and the actual currents id and iq. For example, it may be the electric angular velocity ω and the command currents id* and iq*. Further, it may be the demand torque T* and the electric angular velocity ω. Since the demand torque T* is the input parameter to the command current setting section 26, it is a parameter including current information. Not only the parameter is not limited, the angle may be set variably based on the change direction of the actual current detected in the case of the zero voltage vector.

[Two-Dimensional Coordinate System]

This is not limited to a system, which is defined by the current of d-axis and q-axis. For example, it may be defined by any one of combination of torque and magnetic flux, combination of torque and d-axis current, and combination of torque and q-axis current.

In case of the combination of torque and magnetic flux, the required time period Ts is derived as follows. An estimated torque Te(n+1) and an estimated magnetic flux norm Φe(n+1) are expressed by the following equations (c15) and (c16).

$$Te(n+1)=P\{\Phi\cdot ide(n+1)+(Ld-Lq)\cdot ide(n+1)\cdot iqe(n+1)\} \quad (c15)$$

$$\Phi e(n+1)=\sqrt{\{(Lq\cdot iqe(n+1)^2+(Ld\cdot ide(n+1)+\Phi)^2\}} \quad (c16)$$

A quartic equation of the required time period Ts is derived by substituting the equations (c7) and (c8) for the equations (c15) and (c16) and further substituting the resulting equations (c15) and (c16) for the following equation (c17).

$$K\cdot Te^2+\Phi e2=r^2 \quad (c17)$$

Here, a coefficient K is used to reduce differences in error ratios, because the absolute values of the torque and the magnetic flux norm differ.

[Estimation Section]

As the model equations, equations (c23) and (c24) described below may be used.

The required time period Ts may be updated by a value other than the predetermined period Tc. The control amount change may be simulated differently from linear approximation.

[Provisionally Set Switching Mode]

The switching mode is not limited to all of the modes 0 to 7 or the mode, the number of switchable terminal of which is 1 or less, but may be the mode, the number of switchable terminals of which is 2 or less.

[Rotary Machine]

The rotary machine is not limited to the three-phase rotary machine but may be a rotary machine of four or more phases such as a five-phase rotary machine.

In the above-described embodiments, stator windings are assumed to be star-connected. However the stator windings may be delta-connected. In this case, the terminals and the phases of the rotary machine do not match.

The rotary machine is not limited to the interior permanent magnet synchronous machine, but may be a surface magnet synchronous machine, a field winding synchronous machine or other synchronous machine. Further, it is not limited to the synchronous machine but may be an induction rotary machine such as an induction motor.

The rotary machine need not be used as the main machine of a vehicle.

[Others]

The DC power supply source is not limited to the high voltage battery 12 but may be, for example, an output terminal of a converter for boosting a voltage of the high voltage battery 12.

The power conversion circuit formed switching devices for turning on and off electric connection between voltage application sections for applying voltages of different voltage values and terminals of the rotary machine is not limited to a DC-AC conversion circuit (inverter 11) including switching devices, which selectively connect the terminals of the rotary machine to the positive pole and the negative pole of the DC power supply source. For example, it may be formed of switching devices for selectively turning on and off connection between voltage application sections for applying three or more voltages of different voltage values to phases of a multi-phase rotary machine and the terminals of the rotary machine. The power conversion circuit for applying voltages of different voltage values to the terminals of the rotary machine may be a circuit, which is disclosed, for example, in JP 2006-174697A.

The above equations (c1) and (c2) may be derived as follows.

Three-phase voltage equations are expressed by the following three equations (c18) to (c20) by using the flux linkage Φu, Φv and Φw of the u-, v- and w-phases.

$$vu=R\cdot iu+(d\Phi u/dt) \quad (c18)$$

$$vv=R\cdot iv+(d\Phi v/dt) \quad (c19)$$

$$vw=R\cdot iw+(d\Phi w/dt) \quad (c20)$$

By d-q converting the equations (c18) to (c20), the following equations (c21) and (c22), which uses the flux linkage Φd and Φq on the d-q axes, are derived.

$$vd=R\cdot id+(d\Phi d/dt)-\omega\cdot\Phi q \quad (c21)$$

$$vq=R\cdot iq+(d\Phi q/dt)+\omega\cdot\Phi d \quad (c22)$$

By defining dΦd/did=Ldt in the above-described equation dΦd/dt=(dΦd/did)·(did/dt), a transient inductance Ldt on the d-axis is derived. By defining dΦq/diq=Lqt in the above-described equation dΦq/dt=(dΦq/diq)·(diq/dt), a transient inductance Lqt on the q-axis is derived. By defining Φd=Lds·id+ϕ, the steady-state inductance Lds on the d-axis is derived. By defining Φq=Lqs·iq, the steady-state inductance Lds on the q-axis is derived. The constant term ϕ, which is not proportional to the d-axis current in the flux linkage Φd of the d-axis, is a term of the flux linkage of a permanent magnet.

The transient inductances Ldt and Lqt are smaller than the steady-state inductances Lds and Lqs, respectively. This is because the speed of increase of the magnetic flux relative to an increase in the current is lowered due to magnetic saturation, which occurs when the current increases. The transient inductances Ldt and Lqt and the steady-state inductances Lds and Lqs are preferably set variably in accordance with the current flowing in the motor/generator 10.

It is noted that the above-described changes in inductance are not equivalent to the changes in inductance in the conventional model estimation control, which use the following equations (c23) and (c24).

$$vd=R\cdot id+Ld\cdot(did/dt)-\omega\cdot Lq\cdot iq \quad (c23)$$

$$vq=R\cdot iq+Lq\cdot(diq/dt)+\omega\cdot Ld\cdot id+\omega\cdot\phi \quad (c24)$$

According to the model estimation control using the above-described equations (c23) and (c24), it is not possible to determine uniquely the inductance for accurately estimating the current, in the range, in which the magnetic saturation becomes remarkable. This is because the above-described equations (c23) and (c24) cannot express appropriately that the ratio between the flux linkage and the current changes. Such a situation will not arise in case of the conventional triangular wave comparison PWM control processing. This is because, the command voltages vd* and vq*, which are the operation amount of the current feedback control in case of the triangular wave comparison PWM processing corresponds to the average voltage vector (vda, vqa) in the present embodiment. For this reason, it is possible to maintain the control performance by changing the feedback gain and the like in consideration that the inductances in the equations (c23) and (c24) change in accordance with the torque and the current. This means that the average voltages vda and vqa can be calculated accurately by variably setting the steady-state inductances Lds and Lqs in the model estimation control using the above-described equations (c1) and (c2).

The model estimation control is different from the conventional triangular wave PWM control in that the accuracy of calculation of the change amount in the control amount (current) according to the instantaneous voltage directly affect the control performance according to the model estimation control. It is for this reason that the transient inductances Ldt and Lqt are defined in addition to the steady-state inductances Lds and Lqs by using the above-described equations (c21) and (c22). It is to be noted here that the equations, which are usable in defining the transient inductances Ldt and Lqt in addition to the steady-state inductances Lds and Lqs, are different from the equations defined as $\Phi d=Ld\cdot id+\phi$ and $\Phi q=Lq\cdot iq$ in the above-described equations (c23) and (c24). Because as described in the publication "design and control of interior permanent magnet synchronous motor" authored by Takeda et al and published by Ohm company, the above-described equations (c23) and (c24) are derived by defining the inductance of each phase as $Lu=1+L\cos 2\theta$ in the equations of the three-phase voltages.

Thus, the above-described equations (c1) and (c2) used in the model estimation control according to the present embodiments are not derivable by changes and modifications of the above-described equations (c23) and (c24) used in the conventional model estimation control. The model estimation control using the above-described equations (c1) and (c2) according to the present embodiment is devised by fully reviewing the model equation itself based on the understanding that the control performance cannot be improved by just changing variously the inductance and the like in the model estimation control using the above-described equations (c23) and (c24).

What is claimed is:

1. A control system for a rotary machine comprising:

a power conversion circuit, which includes switching devices and controls a control amount including at least one of current, torque and flux linkage of the rotary machine by turning on and off the switching devices, the switching devices of the power conversion circuit turning on and off electric connection of voltage supply sections, which supply respective voltages different one another, and terminals of the rotary machine;

an estimation section, which is configured to estimate a time period required for a degree of deviation between the control amount and a command value reaching a predetermined value with respect to a specified switching mode among switching modes indicating an on/off condition of each of the switching devices of the power conversion circuit; wherein:

the estimation section is configured to set an update timing of the switching mode based on the estimated required time period;

the estimation section includes a determination section configured to provisionally set a switching mode, estimate the required time period in accordance with each provisionally set switching mode, evaluate the switching mode based on an estimation result of the estimate of the required time period, and use the switching mode having a highest evaluation result of the evaluation of the switching mode in actually driving the power conversion circuit, and the control system further comprises a drive section configured to drive the power conversion circuit based on the determined switching mode; and the determination section is configured to assign a higher evaluation to the switching mode having a long required time period than to the switching mode having a short required time period.

2. The control system for a rotary machine according to claim 1, wherein:

the estimation section is further configured to variably set the predetermined value in accordance with at least one of the torque and the electric angular velocity of the rotary machine.

3. The control system for a rotary machine according to claim 1, wherein:

the control amount, which indicates the required time period for the degree of deviation from the command value reaches the specified value has, as two components thereof, at least one of a set of a d-axis current and a q-axis current, a set of a torque and a magnetic flux, a set of the torque and the d-axis current, and a set of the torque and the q-axis current.

4. The control system for a rotary machine according to claim 1, wherein:

the estimation section is configured to update the estimated required time period at a predetermined interval by estimating the required time period at the predetermined interval.

5. A control system for a rotary machine comprising:

a power conversion circuit, which includes switching devices and controls a control amount including at least one of current, torque and flux linkage of the rotary machine by turning on and off the switching devices, the switching devices of the power conversion circuit turning on and off electric connection of voltage supply sections, which supply respective voltages different one another, and terminals of the rotary machine;

an estimation section, which is configured to estimate a time period required for a degree of deviation between the control amount and a command value reaching a predetermined value with respect to a specified switching mode among switching modes indicating an on/off condition of each of the switching devices of the power conversion circuit; wherein:

the estimation section is configured to set an update timing of the switching mode based on the estimated required time period;

the estimation section includes a determination section configured to provisionally sets a switching mode, estimate the required time period in accordance with each provisionally set switching mode, evaluate the switching mode based on an estimation result of the estimate of the required time period, and use the switching mode having a highest evaluation result of the evaluation of the switching mode in actually driving the power conversion circuit, and the control system further comprises a drive section configured to drive the power conversion circuit based on the determined switching mode; and the determination section is configured to assign a higher evaluation to the switching mode having a small deviation between the required time period and a target time period than to the switching mode having a large deviation between the required time period and the target time.

6. The control system for a rotary machine according to claim 5, further comprising:

the estimation section is further configured to variably set the predetermined value in accordance with at least one of the torque and the electric angular velocity of the rotary machine.

7. The control system for a rotary machine according to claim 5, wherein:

the control amount, which indicates the required time period for the degree of deviation from the command value reaches the specified value has, as two components thereof, at least one of a set of a d-axis current and a q-axis current, a set of a torque and a magnetic flux, a set of the torque and the d-axis current, and a set of the torque and the q-axis current.

8. The control system for a rotary machine according to claim 5, wherein:

the estimation section is configured to update the estimated required time period at a predetermined interval by estimating the required time period at the predetermined interval.

9. A control system for a rotary machine comprising:

a power conversion circuit, which includes switching devices and controls a control amount including at least one of current, torque and flux linkage of the rotary machine by turning on and off the switching devices, the switching devices of the power conversion circuit turning on and off electric connection of voltage supply sections, which supply respective voltages different one another, and terminals of the rotary machine; and an estimation section, which is configured to estimate a time period required for a degree of deviation between the control amount and a command value reaching a predetermined value with respect to a specified switching mode among switching modes indicating an on/off condition of each of the switching devices of the power conversion circuit; wherein the estimation section is configured to set an update timing of the switching mode based on the estimated required time period; wherein:

the estimation section is further configured to variably set an angle of a straight line, which has a longest length between two points at which straight lines cross a closed curve line, the closed curve line defining a range, in which the control amount is smaller than the specified value with the command value being set at an origin point of a fixed two-dimensional coordinate system, wherein the control amount, which indicates the required time period for the degree of deviation from the command value reaches the specified value is expressed in the fixed two-dimensional coordinate system.

10. A control system for a rotary machine comprising:

a power conversion circuit, which includes switching devices and controls a control amount including at least one of current, torque and flux linkage of the rotary machine by turning on and off the switching devices, the switching devices of the power conversion circuit turning on and off electric connection of voltage supply sections, which supply respective voltages different one another, and terminals of the rotary machine;

an estimation section, which is configured to estimate a time period required for a degree of deviation between the control amount and a command value reaching a predetermined value with respect to a specified switching mode among switching modes indicating an on/off condition of each of the switching devices of the power conversion circuit; wherein:

the estimation section is configured to set an update timing of the switching mode based on the estimated required time period;

the estimation section includes a determination section, which is configured to provisionally set a switching mode, estimate the required time period in accordance with each provisionally set switching mode, evaluate the switching mode based on an estimation result of the estimate of the required time period, and use the switching mode having a highest evaluation result of the evaluation of the switching mode in actually driving the power conversion circuit; and the determination section is configured to increase the evaluation of the switching mode, which reduces the deviation between the control amount and the command value when the degree of deviation between the control amount and the command value is larger than the specified value and the estimation result of the estimation section indicates that the degree of deviation between the control amount and the command value remains larger than the specified value even after an upper limit time period.

* * * * *